(12) United States Patent
Xue et al.

(10) Patent No.: US 10,734,656 B2
(45) Date of Patent: Aug. 4, 2020

(54) FABRICATION METHOD FOR MICRO-TUBULAR SOLID OXIDE CELLS

(71) Applicant: University of South Carolina, Columbia, SC (US)

(72) Inventors: Xingjian Xue, Chapin, SC (US); Chunlei Ren, Columbia, SC (US)

(73) Assignee: University of South Carolina, Columbia, SC (US)

( * ) Notice: Subject to any disclaimer, the term of this patent is extended or adjusted under 35 U.S.C. 154(b) by 77 days.

(21) Appl. No.: 15/676,312

(22) Filed: Aug. 14, 2017

(65) Prior Publication Data

US 2018/0053947 A1 Feb. 22, 2018

Related U.S. Application Data

(60) Provisional application No. 62/375,565, filed on Aug. 16, 2016.

(51) Int. Cl.
*H01M 4/86* (2006.01)
*H01M 4/88* (2006.01)
(Continued)

(52) U.S. Cl.
CPC ......... *H01M 4/8864* (2013.01); *B29C 48/022* (2019.02); *B29C 48/09* (2019.02);
(Continued)

(58) Field of Classification Search
CPC ............. H01M 4/4864; H01M 4/8864; H01M 8/1213; H01M 8/124; H01M 2008/1293; H04M 3/08–14; H04M 1/10; H04M 1/18; H04M 1/23; B29C 48/9105; B29C 48/022; B29C 48/09; B29C 48/21; C04B 35/2608; C04B 35/2616; C04B 35/2625; B29L 2031/3468
(Continued)

(56) References Cited

U.S. PATENT DOCUMENTS

| | | | |
|---|---|---|---|
| 4,784,812 A | * | 11/1988 | Saitoh .................. C04B 35/632 |
| | | | 106/123.11 |
| 6,416,897 B1 | | 6/2002 | Tomlins et al. |

(Continued)

OTHER PUBLICATIONS

H. Strathmann and K. Kock, The Formation Mechanism of phase inversion membranes, Jan. 25, 1977, Elsevier Publising (Year: 1977).*

(Continued)

*Primary Examiner* — Erin Snelting
*Assistant Examiner* — Andrés E. Behrens, Jr.
(74) *Attorney, Agent, or Firm* — Dority & Manning, P.A.

(57) ABSTRACT

A method for forming tubular solid oxide cells is described. The methods include co-extrusion of an electrode precursor and a sacrificial material to form a multi-layered precursor followed by phase inversion and sintering to remove the sacrificial layer and form an electrode substrate for use in a tubular solid oxide cell. Upon phase inversion and sintering of the precursor, a micro-channel array can be generated in the electrode that is generally perpendicular to the tube surface. The open pored micro-scale geometry of the porous electrode substrate can significantly reduce resistance for fuel/gas transport and increase effective surface area for electrochemical reactions.

19 Claims, 19 Drawing Sheets

(51) Int. Cl.

| | | |
|---|---|---|
| H01M 8/1246 | (2016.01) | |
| B29C 48/09 | (2019.01) | |
| B29C 48/21 | (2019.01) | |
| B29C 48/16 | (2019.01) | |
| B29C 31/10 | (2006.01) | |
| B29C 48/345 | (2019.01) | |
| B29C 35/04 | (2006.01) | |
| H01M 8/1213 | (2016.01) | |
| B29C 48/91 | (2019.01) | |
| B29C 48/00 | (2019.01) | |
| H01M 8/00 | (2016.01) | |
| H01M 8/124 | (2016.01) | |
| B29L 31/34 | (2006.01) | |

(52) U.S. Cl.
CPC .......... *B29C 48/21* (2019.02); *B29C 48/9105* (2019.02); *H01M 4/8889* (2013.01); *H01M 8/004* (2013.01); *H01M 8/1213* (2013.01); *B29L 2031/3468* (2013.01); *H01M 8/1246* (2013.01); *H01M 2008/1293* (2013.01)

(58) Field of Classification Search
USPC ........................................................ 264/614
See application file for complete search history.

(56) References Cited

U.S. PATENT DOCUMENTS

| | | | | |
|---|---|---|---|---|
| 2010/0258504 | A1* | 10/2010 | Ab Wahid | B01D 61/145 210/650 |
| 2011/0272081 | A1* | 11/2011 | Devoe | H01M 8/006 156/89.12 |
| 2012/0003556 | A1* | 1/2012 | Devoe | H01M 8/0202 429/428 |
| 2012/0216903 | A1* | 8/2012 | Osborne | B65H 69/08 138/137 |
| 2012/0285882 | A1* | 11/2012 | Teoh | B01D 69/06 210/500.22 |
| 2013/0095380 | A1* | 4/2013 | Affinito | H01M 4/13 429/207 |
| 2015/0020685 | A1* | 1/2015 | Bhandari | B01D 69/088 96/10 |
| 2015/0136691 | A1* | 5/2015 | Yang | B01D 69/08 210/500.23 |
| 2017/0101719 | A1* | 4/2017 | Alvarez | C25B 9/08 |

OTHER PUBLICATIONS

H. Strathmann and K. Kook, the Formation Mechanism of phase inversion membranes, Jan, 25, 1977, Elsevier Publishing (Year: 1977).*

JWikipedia article on Dispersants, snapshot from Jul. 17, 2016 (Online wayback machine), [Retrieved on Sep. 15, 2019]. https://web.archive.org/web/20160617035405/https://en.wikipedia.org/wiki/Dispersant (Year: 2016).*

Strathmann, H., and K. Kock. "The Formation Mechanism of Phase Inversion Membranes." Desalination, vol. 21, No. 3, 1977, pp. 241-255., doi:10.1016/s0011-9164(00)88244-2. (Year: 1977).*

Wijmans, J.g., et al. "The Mechanism of Formation of Microporous or Skinned Membranes Produced by Immersion Precipitation." Journal of Membrane Science, vol. 14, No. 3, 1983, pp. 263-274., doi:10.1016/0376-7388(83)80005-2. (Year: 1983).*

Wienk, I.m., et al. "Recent Advances in the Formation of Phase Inversion Membranes Made from Amorphous or Semi-Crystalline Polymers." Journal of Membrane Science, vol. 113, No. 2, 1996, pp. 361-371., doi:10.1016/0376-7388(95)00256-1. (Year: 1996).*

Wallace, David W., et al. "Efficient Development of Effective Hollow Fiber Membranes for Gas Separations from Novel Polymers." Journal of Membrane Science, vol. 278, No. 1-2, 2006, pp. 92-104., doi:10.1016/j.memsci.2005.11.001. (Year: 2005).*

Ren, Chunlei, et al. "Fabrication and Characterization of High Performance Intermediate Temperature Micro-Tubular Solid Oxide Fuel Cells." Journal of the Electrochemical Society 163.9 (2016): F1115-F1123.

Ren, et al. "Fabrication and Characterization of High Performance Intermediate Temperature Micro-Tubular Solid Oxide Fuel Cells" J. Electrochem. Soc. 163(9) (2016) pp. F1115-F1123.

* cited by examiner

FABRICATION METHOD FOR MICRO-TUBULAR SOLID OXIDE CELLS

CROSS-REFERENCE TO RELATED APPLICATION

This application claims filing benefit of U.S. Provisional Patent Application Ser. No. 62/375,565, having a filing date of Aug. 16, 2016, which is incorporated herein by reference for all purposes.

FEDERAL RESEARCH STATEMENT

This invention was made with Government support under Grant No. NNX14AB26G, awarded by the National Aeronautics and Space Administration. The Government has certain rights in the invention.

BACKGROUND

The solid oxide cell is an environmentally friendly and highly efficient energy conversion technology that can convert chemical energy directly to electricity in the fuel cell mode (SOFC) and vice versa in the electrolysis mode (SOEC). This technology has wide stationary and mobile applications and is of interest in power applications (e.g., transportation and power grid applications), in fuel production and energy storage, in chemical synthesis, and as an electrolyzer in various applications (e.g., pressurized oxygen production in medical applications). In general, a solid oxide cell includes a solid oxide ionic (or protonic) conducting material layer as electrolyte separating two electrodes that are also based on ceramics that become electrically or ionically active at relatively high temperatures. In the fuel cell mode oxygen is reduced at a first electrode (the cathode) to form oxygen ions that diffuse across the electrolyte and serve to oxidize the fuel, e.g., hydrogen gas, carbon monoxide gas, to form water and carbon dioxide gases, respectively, at the second electrode (the anode) in order to produce electricity. The process is reversed in the electrolysis mode during which water can be electrolyzed to produce hydrogen and oxygen gases, or carbon dioxide can be electrolyzed to produce carbon monoxide and oxygen gases.

Among various configuration designs, micro-tubular solid oxide cells (MT-SOFCs) have attracted increasing attention due to the advantages of good thermal cycling stability, good thermal shock resistance, easy sealing, high volumetric power density, and quick start-up capability. Unfortunately, the micro-tubular configuration imposes great challenges on fabrication process designs, especially when the diameters of the micro-tubes reach millimeter or sub-millimeter scales, which are required to meet volumetric power density goals. A phase inversion-based spinning method has been successfully demonstrated for the fabrication of anode-supported MT-SOFCs. Typical microtubular anode substrates prepared by this method have the feature of multiple-layered microstructures, with a sponge-like layer sandwiched by two thicker layers and including thin but relatively dense skin layers covering the inner and outer surfaces of the anode. The thick layers define large continuous finger-like pores perpendicular to the sponge-like layer, but both the sponge-like layer and the skin layers contain small and non-continuous pores. As a result, the porosity of these structures is very low. These anode substrates, albeit unique, show serious disadvantages for facile fuel/gas transport as, although the thick finger-like layers do facilitate gas transport, the poor transport properties of the sponge-like layer and the thin skin layer of the inner surface of the substrate can significantly increase resistance to fuel/gas diffusion. This in turn can severely deteriorate electrochemical performance of MT-SOFCs.

A need exists for improved methods for synthesizing microtubular electrodes for use in solid oxide fuel/electrolysis cells. For instance, a method that can provide a microtubular electrode substrate that can demonstrate improved fuel/gas diffusion can provide for improved electrochemical performance of MT-SOFCs.

SUMMARY

Objects and advantages of the invention will be set forth in part in the following description, or may be obvious from the description, or may be learned through practice of the invention.

Methods are provided for synthesizing a tubular electrode substrate. In general, a method can include co-extruding a first composition and a second composition to form a co-axial multi-layer precursor tube. The first composition can include a solid oxide electrode material (e.g., an oxide suitable for use as an anode) in conjunction with a polymeric binder and a solvent. Upon the co-extrusion, the first composition can form a first electrode precursor layer of the multi-layer precursor tube and the second composition can form a sacrificial layer of the multi-layer precursor tube.

A method can also include contacting the co-axial multi-layer precursor tube with an anti-solvent according to a phase inversion process so as to form porous sub-layers in the multi-layer precursor tube. Following the phase inversion, the multi-layer tube can be heated so as to sinter the solid oxide electrode material of the first electrode layer and also to remove the sacrificial layer.

A method can also include forming an electrolyte layer on the tube. For instance, a third composition that includes a solid oxide electrolyte material can be applied to the first electrode layer to form an electrolyte layer on the multi-layer tube. The solid oxide electrolyte material can also be sintered; either at the same time as the solid oxide electrode material of the first electrode layer or at a later time, as desired.

A method can also include forming a second electrode layer on the tube. For instance, a fourth composition can be applied to the electrolyte layer to form a second electrode layer. The fourth composition can include a second solid oxide electrode material (e.g., an oxide suitable for use as a cathode). The fourth composition can be applied such that the electrolyte layer will be between the two electrode layers. The second electrode material can also be sintered to form a microtubular solid oxide cell. A single microtubular structure can be combined with current collectors, additional cells, interconnects, fluid flow lines, etc. to form a solid oxide cell system.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which.

DETAILED DESCRIPTION

Reference now will be made to embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied in exemplary constructions.

The present disclosure is generally directed to a method for forming tubular solid oxide cells, and in particular small tubular solid oxide cells having diameters on the millimeter scale. The formation methods include a multi-layer co-extrusion and phase inversion approach to fabricate an electrode substrate precursor for use in a tubular solid oxide cell. Through utilization of the method, the electrode substrate can include a channeled porous structure that can provide excellent fuel/gas diffusion and electrochemical characteristics. The method includes co-extrusion of a composition including an electrode material in conjunction with a composition that will form a sacrificial layer to form a coaxial, multi-layered electrode precursor. Upon phase inversion and sintering of the multi-layer precursor, a micro-channel array can be generated in the electrode layer that is generally perpendicular to the tube surface. The open pored micro-scale geometry of the porous electrode substrate can significantly reduce resistance for fuel/gas transport and increase effective surface area for electrochemical reactions.

While the following disclosure is primarily directed to the formation of anode-supported solid oxide fuel cells (SOFC), it should be understood that the present disclosure is in no way limited to anode supported SOFC formation. Disclosed methods can be used to fabricate functional ceramic devices for energy conversion and storage including, without limitation, solid oxide fuel cells, solid oxide electrolysis cells, redox flow batteries, as well as ceramic gas separation membranes.

Figure 1:
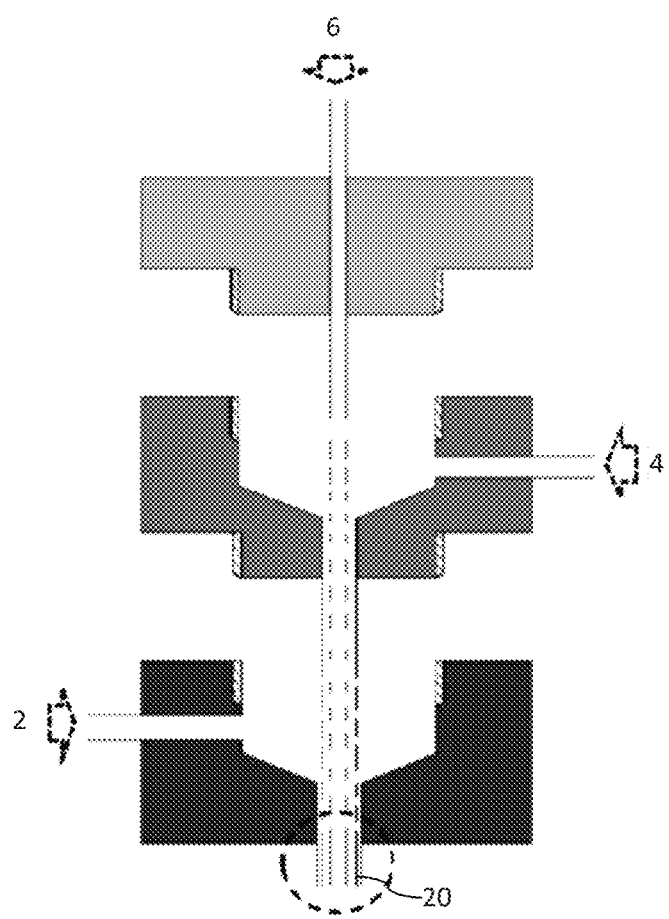
FIG. 1 schematically illustrates a co-extrusion system as described herein.

A micro-tubular multi-layer electrode precursor tube can be prepared by use of a co-extrusion spinneret. FIG. 1 schematically illustrates a co-extrusion process and system as may be utilized. As can be seen, a spinneret can include inlets 2, 4 for compositions, generally in the form of slurries that will be co-extruded in a co-axial configuration. In addition, the spinneret can include an inlet 6 for a coagulant that can be fed axially through the spinneret in conjunction with the co-extruded slurries. The co-extrusion process can form a multi-layered electrode precursor 20 in the shape of a multi-layered hollow tube that exits the spinneret as shown.

Figure 2:
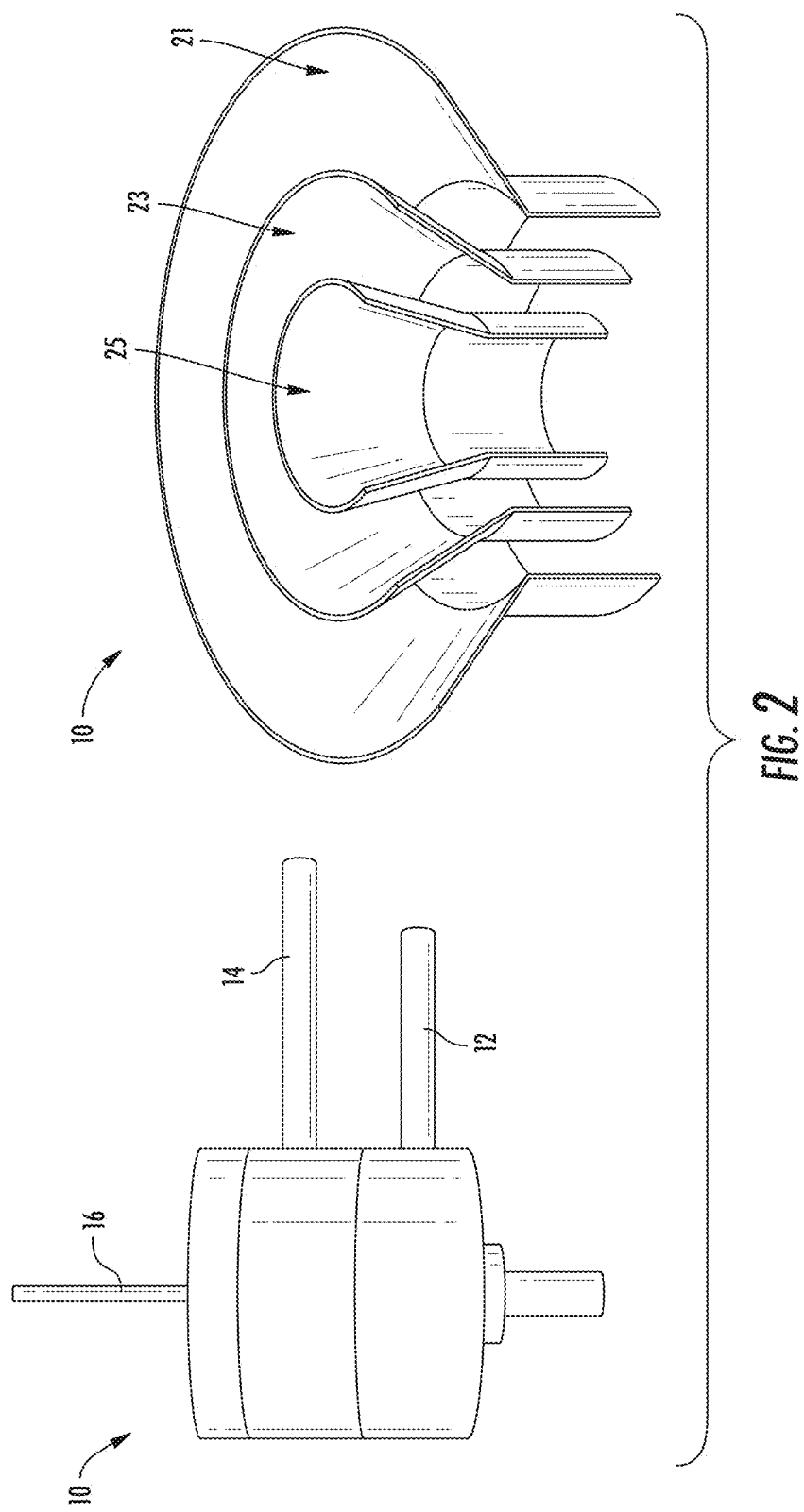
FIG. 2 illustrates a spinneret for a co-extrusion (left) and a schematic cut-away of the spinneret (right) as may be utilized in a formation method.

One example of a suitable spinneret 10 is shown in FIG. 2. As shown, the spinneret includes a first inlet 12, a second inlet 14, and a third inlet 16. The first and second inlets 12, 14 can be configured to direct first and second slurries, respectively, through the spinneret 10 and the third inlet 16 can provide for an axial flow of a coagulant. The right panel of FIG. 2 presents a cut-away view of the spinneret 10 illustrating the co-axial flow space 25 for the coagulant, an inner ring 23 for a first slurry and an outer ring 21 for a second slurry.

A spinneret can be formed of materials as are known in the art, e.g., stainless steel, and can be sized to form the co-extruded precursor multi-layer tube of the desired size. In general, a co-extruded multi-layer electrode precursor tube can have an overall outside diameter of about 3 millimeters or less, or about 1 millimeter or less in some embodiments. For instance, a multi-layer precursor tube can have an outside diameter of from about 0.2 millimeters to about 2 millimeters in some embodiments.

Likewise, the mold casings can be sized to form the individual layers of the extruded precursor to a predetermined size. For instance, the cross-sectional wall thickness of an individual extruded layer of a multi-layer precursor electrode tube can be about 1 millimeter or less, or about 500 micrometers or less in some embodiments. For instance, the cross sectional wall thickness of a single layer of the co-extruded electrode precursor tube can be from about 50 micrometers to about 500 micrometers, in some embodiments.

Figure 3:
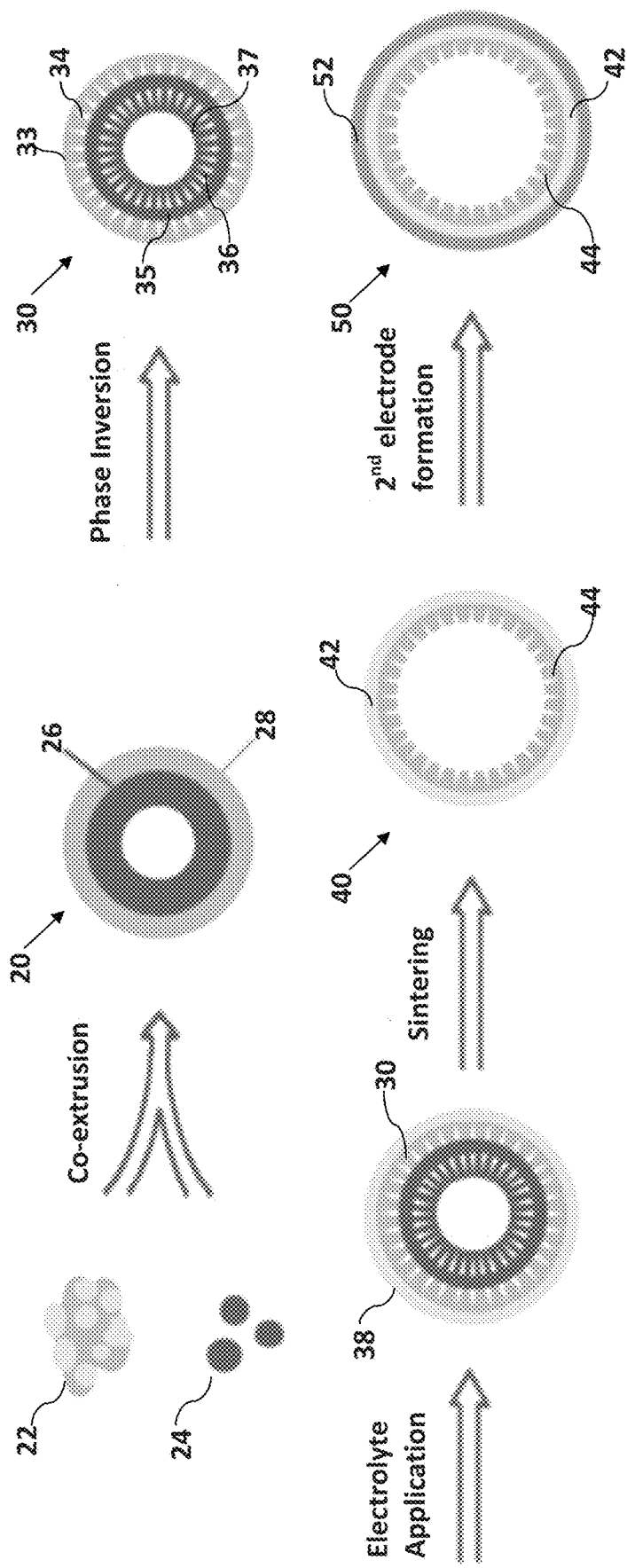
FIG. 3 illustrates cross sectional views of starting materials, intermediate structures, and a tubular solid oxide cell as may be formed in one embodiment of a process.

A schematic illustration of a fuel cell preparation process is shown in FIG. 3, which presents cross sectional views of a tubular fuel cell at several stages of the formation process. The method includes co-extrusion as illustrated in FIG. 1 of a first composition 22 that includes an electrode material and a second composition 24 that will form a sacrificial layer on the electrode precursor. Upon initial co-extrusion a multi-layered electrode precursor 20 can be formed in the shape of a hollow tube. For instance, the extruded electrode precursor layer 28 that includes the electrode material can be external to the sacrificial layer 26 formed of the second composition 24.

The electrode material can generally include any ceramic suitable for use in a solid oxide cell. For instance, in one embodiment, the method can be utilized to form an anode-supported solid oxide electrode, in which case the extruded composition can be a slurry that includes the desired anode material. An anode-supported solid oxide cell may be desired in one embodiment as compared to electrolyte- and cathode-supported designs, anode-supported SOFCs may significantly reduce ohmic resistance loss and polarization resistance loss, and therefore as such are being widely employed.

Any suitable anode material can be co-extruded according to the present disclosure. The most common material used is a cermet made up of nickel oxide mixed with the ceramic material that is used for the electrolyte in that particular cell. Typical ceramics can include, without limitation, YSZ (yttria stabilized zirconia), gadolinium-doped ceria (GDC or GCO; e.g., $Gd_{0.1}Ce_{0.9}O_{1.95}$), samarium-doped ceria (SDC; e.g., $Ce_{0.8}Sm_{0.2}O_{1.9}$), and so forth.

When considering formation of a cathode-supported solid oxide cell, a composition including the cathode material can be co-extruded to form the electrode precursor. Some exemplary cathode materials include, without limitation, praseodymium-doped barium cobalts (PBC) such as praseodymium-doped barium cobalt oxide (e.g., $PrBaCo_2O_{5+\delta}$ (PBCO); wherein δ is the oxygen ion deficit); praseodymium-doped barium ferrites (e.g., $PrBaFe_2O_{5+\delta}$ (PBFO); a PBC or PBFO combined with the electrolyte ceramic, e.g., PBC-BCPY ($BaCe_{0.4}Pr_{0.4}Y_{0.2}O_{3-\delta}$) or PBC-BZCY ($BaZr_{0.1}Ce_{0.7}Y_{0.2}O_{3-\delta}$); lanthanum strontium cobalt ferrites (LSCF); LSCF combined with a secondary component such as $BaZr_{1-x-y-z}Ce_xY_yYb_zO_{3-\delta}$ (where x, y z are dopant levels and $0<x+y+z<1$) (BZCYYb), e.g., LSCF-BZCYYb; strontium doped lanthanum manganate (also known as lanthanum strontium manganate (LSM)) or a mixture of the electrolyte ceramic (e.g., SDC) and LSM.

The electrode precursor composition can include the electrode material in conjunction with a binder, solvent, dispersant, etc. as is generally known in the art. As discussed further herein, the solids content of the composition can affect the geometry of the porosity formed in the electrode precursory. Specifically, as the solids content of the composition can affect rate of the exchange process during the phase inversion process, it is believed that the solids content of the composition can play an important role on determining the relative locations of sub-layers exhibiting different porosities, and in particular the location of the finger-like sub-layers and sponge-like sub-layer. In general, the solids content (e.g., the content of the electrode material in the extrudable composition) can be about 80% by weight or less, about 75% or less, or about 70% or less of the composition.

The binder is not particularly limited and conventionally known organic binders can be appropriately used. However, and as discussed further below, a formation process can include a phase inversion process. As such, binders for use in the process can generally include those that are soluble in the solvent and insoluble in the anti-solvent of the phase inversion process. Some examples of suitable polymer binders include, without limitation, polyethersulfone (PESf), ethylene-vinyl alcohol (EVAL), cellulose acetate (CA), polysulfone (Psf), polyacrylonitrile (PAN), cellulosics, polyvinylidene fluoride (PVDF), polyimides (PI), polyamides (PA), acrylonitrile butadiene styrene (ABS), polycarbonate (PC), polylactic acid (PLA), high density polyethylene (HDPE), PC/ABS, and polyphenylsulfone (PPSU) or mixtures thereof. The amount of the polymer binder that is used is the method may contribute to the final structure of the electrode. The weight ratios of polymer to solvent can be, for example, in the range from 10% to 50%.

The composition can also include a solvent that can enable phase inversion to occur. The solvent can be one that is miscible with the anti-solvent, and may be referred to as an anti-solvent miscible solvent. The solvent can also be solvent that is suitable for dissolving the binder (as well as other components of the composition). Suitable examples of the solvent can include, without limitation, 1-Methyl-2-pyrrolidone (NMP), acetone, dimethyl sulfoxide (DMSO), dimethyl formamide (DMF) and tetrahydrofuran (THF), dimethylacetamide (DMAc), formyl piperidine (FP), dioxane, acetic acid (HAc), morpholine (MP) and mixtures thereof.

The composition can also include one or more additional components as are generally known in the art. One example of such an additional component is a dispersant that can prevent the components of the composition from clumping. Clumping can result in a non-homogeneous solution and a non-uniform article, which is undesirable. Examples of suitable dispersants include polyvinylpyrrolidone (PVP), polyethylene glycol, propionic acid or surfactants such as Span-80.

The second composition 24 that can form a sacrificial layer on the multi-layer electrode precursor tube 20 can include a solid particulate in conjunction with a solvent, binder, and one or more additional components as described above for the electrode precursor composition. In general, the solid particulate can be a carbon-based particulate, e.g., graphite, which can be provided at a particles size on the order of the size of the electrode material solids.

The second composition can include a binder, solvent, etc. the same or of similar characteristics to that of the electrode precursor composition. While it is not a requirement that the compositions include the same components save for the solid particulates, this may prove beneficial in some embodiments, as use of the same secondary components can provide more consistent results in the post-extrusion phase inversion process. Thus, in one embodiment, the only difference between the compositions that are co-extruded can be the solids included, with the first composition including the electrode material and the second composition including a sacrificial material.

The two compositions can be extruded through the mold in conjunction with a coagulant that can be fed through the center of the mold so as to begin coagulation of the slurries and maintain the structure of the tube during the initial stages of the phase inversion process. The coagulant can generally be any anti-solvent for the polymer binder. The anti-solvent may be any material that is miscible with the solvent but will not dissolve the polymer binder, to allow phase inversion to occur. Examples of suitable anti-solvents include, without limitation, water, ethanol, glycol, isopropanol or mixtures thereof. For instance, in one embodiment, water can be fed through the center of the mold in conjunction with the co-extrusion of the two compositions.

Referring again to FIG. 3, following co-extrusion of the compositions, the co-extruded multi-layer electrode precursor tubular body 20 thus formed can be subjected to a phase inversion process, also referred to as a solvent exchange process, which can solidify the polymer binder and form porosity in the coagulated precursor tube 30. The phase inversion includes immersion of the multi-layer electrode precursor tube 20 into a bath of an anti-solvent (also referred to as a coagulation bath herein). Optionally, the bath may also contain a mixture of solvent and anti-solvent which, among other things, may affect the kinetics of the solvent exchange process. The anti-solvent and the solvent are miscible and upon the immersion, the polymer binder (and optionally additional polymers such as a dispersant) precipitates from solution to solidify and form porosity in the coagulated precursor tube 30.

In those embodiments in which the phase inversion bath includes solvent in addition to anti-solvent, the ratio of the amount of solvent to the amount of the anti-solvent that is used may contribute to the final structure of the electrode. In one embodiment, the ratio of solvent:anti-solvent can be about 5:1 or greater, or in the range of 10:1 to 100:1 in some embodiments.

There is no particular method for locating the multi-layer precursor tube in the anti-solvent phase inversion bath. For instance, the tube may be placed into the coagulation bath following extrusion, or the bath may be arranged such that a continuously moving extrudate can be fed continuously from the mold into the bath. In the solvent exchange process, the polymer solvent, miscible with the bath of anti-solvent in which it is immersed, begins to disperse out of the multi-layer tube to mix with the anti-solvent bath, being continuously replaced in the tube with anti-solvent. As the exchange of solvent for anti-solvent transpires within the walls of the tube, the composition of the tube changes from polymer and solvent to a mixture of polymer, solvent and anti-solvent, with the percentage of anti-solvent continuously increasing. Thus, the solubility of the polymer is negatively affected, and the polymer begins to precipitate out of solution when the anti-solvent becomes a sufficiently high percentage within the tube. Eventually, the anti-solvent substantially replaces all of the solvent within the film and porosity is formed in the tube walls of the coagulated precursor tube 30, as shown in FIG. 3.

The phase inversion process may be allowed to progress over a period of time that can depend on the thickness of the walls and the slurry composition. In general, however, the phase inversion process may be carried out over a period of time from about 10 minutes to about 48 hours. For example, the phase inversion may be allowed to continue for a period of about 24 hours in one embodiment.

Following the phase inversion process, the multi-layered coagulated precursor tube 30 can exhibit a series of sub-layer microstructures across the cross section of the tube. In particular, and as illustrated in FIG. 3, following phase inversion, the coagulated multi-layered coagulated precursor tube 30 can exhibit a porous microstructures in the following order from external to internal of the tube wall: outer surface skin sub-layer 33, outer finger-like sub-layer 34, sponge-like sub-layer 35, inner finger-like sub-layer 36, and inner surface skin sub-layer 37.

The external and internal skin sub-layers 33, 37 are generally quite thin, on the order of a few micrometers at most, and exhibit relatively small, discontinuous porosity. The finger-like sub-layers 34, 36 include a micro-channel array structure in which the micro-channels are well aligned radially and exhibit a high degree of connectivity through the tube surface into the interior of the coagulated precursor tube 30. The sponge-like sub-layer 35 includes relatively small, discontinuous porosity.

Beneficially, it has been discovered that through control of the characteristics of the extrusion process, and in one particular embodiment, through control of the solids content of the extrudates, the micro-channel array structure can be varied so as to locate the various sub-layers (finger-like, sponge-like) in all or part of one of the layers. For instance, in the embodiment described in the Examples section, below, by forming the extrudates to have a lower solids content (about 70 wt. % in the example), the sponge-like sub-layer 35 can be formed entirely in the sacrificial layer 26 of the extruded multi-layer electrode precursor tube 20 and the outer finger-like sub-layer 34 can be formed such that it spans across the electrode precursor layer 28 and the sacrificial layer 26 of the extruded multi-layer electrode precursor tube 20 (i.e., a portion of the finger-like sub-layer 34 in each layer 26, 28).

Upon sintering of the coagulated multi-layer coagulated precursor tube 30, the sacrificial layer 26 and thus all sublayers of the coagulated precursor tube 30 formed of the sacrificial material 24 will be removed. The sintering temperature can be suitable for the electrode material as is known in the art, generally up to about 1500° C., for instance from about 1000° C. to about 1500° C., with a preferred temperature generally depending upon the specific materials of the electrode. Following sintering, the remaining sintered first electrode layer 44 of the sintered tube 40 can generally be about 500 micrometers or less in wall thickness, for instance about 400 micrometers or less or about 300 micrometers or less in some embodiments.

The sintering process will remove the sacrificial material, which can encompass the inner surface skin sub-layer 37, the inner finger-like sub-layer 36, the sponge-like sub-layer 35, and even a portion of the outer finger-like sub-layer 34 of the coagulated precursor tube 30. As a result, the micro-channel array generated in the first electrode layer 44 of the sintered tube 40 can have an open porous micro-channel array structure (see, e.g., FIG. 3 and FIG. 7C at c4) with the micro-channels of the outer finger-like sub-layer 34 opened at the inner surface of the first electrode layer 44 and exhibiting radial alignment and a high degree of connectivity across the first electrode layer 44. The porosity of the first electrode layer 44 can provide facile fuel/gas diffusion during use. For instance, the permeability of an anode substrate can be about 9 times that of a similar electrode substrate fabricated using the phase inversion-based single layer extrusion method. The peak power density of a fuel cell include the electrode thus formed can be about double or even greater than that of a similar cell with the supporting layer fabricated from the single layer extrusion method. The fuel utilization rate can also be significantly improved in different degrees, generally depending on the supplied inlet fuel flow rates.

Because previously known tubular solid oxide cells can be the same as the cells formed as described herein in material system and fabrication processes except for the co-extrusion/phase inversion/sacrificial process used to form the supporting electrode, it is reasonable to assume that the microstructure of the electrode substrate is responsible for the difference in electrochemical performance. In particular, it is believed that the more-open porous microstructure of the electrode substrate contributes to the improved performance of disclosed cells over conventional cells.

The solid oxide cells can include an electrolyte layer 42 on the first electrode layer 44. For instance, in the embodiment of FIG. 3, an electrolyte precursor layer 38 can be applied to the multi-layer coagulated precursor tube 30 prior to sintering. As such, the coagulated precursor tube 30 and the electrolyte precursor layer 38 can be sintered at the same time to form the first electrode layer 44 and the electrolyte layer 42 of the sintered tube 40. While it is not a requirement that the electrolyte precursor layer 38 be applied and sintered simultaneously with the coagulated precursor tube 30, it can be preferred to do so as the sintered electrolyte layer 42 can provide some support for the porous sintered first electrode layer 44. The sintered electrolyte layer can generally have a wall thickness of about 30 micrometers or less, for instance about 20 micrometers or less in some embodiments, or about 15 micrometers or less in some embodiments.

In general, any suitable electrolyte material contained in any suitable electrolyte composition can be utilized, with the preferred characteristics of the electrolyte generally depending upon the procedure utilized to coat the composition of the electrolyte precursor layer 38 onto the coagulated precursor tube 30 (or a previously sintered precursor tube). For instance, in one embodiment an electrolyte precursor layer 38 can be applied to the coagulated precursor tube 30 by dip-coating or brush painting.

Electrolytes as may be incorporated in a solid oxide cell can include oxygen ion conducting electrolytes or proton conducting electrolytes, as desired. Oxygen ion conductors have been the conventional conductors for electrolyte use in solid oxide cells. However, proton conductors are also available for use. Proton-conducting electrolytes can have the advantages of high proton conductivity and low activation energy at intermediate temperatures, which may widen the selection of materials to be used in the solid oxide cells. Advantages of proton-conducting electrolytes include water being generated in the cathode side of the solid oxide cells, thus avoiding fuel dilution at the anode side.

The prevailing material for an oxygen ion type solid electrolyte is yttria-stabilized zirconia (YSZ) or a ceria-based composition. A ceria based composition can include $CeO_2$ and a metal dopant. The metal dopant in the ceria based composition can generally be at an amount equal to or more than about 10 wt. % and less than about 30 wt. % based on a total weight of the ceria based composition. The metal dopant can include, without limitation, samarium and gadolinium. Examples of doped ceria-based electrolyte materials can include $Ce_{0.8}Sm_{0.2}O_{1.9}$ (SDC) and $Ce_{0.9}Gd_{0.1}O_2$ (GDC). Other suitable electrolyte materials can include Y-doped $BaZrO_3$ (BYZ), Y-doped $BaCeO_3$ (BCY), yttrium- and ytterbium-doped barium-zirconate-cerate (BZCYYb), scandia doped BZCY (BZCYSc), scandia stabilized zirconia (ScSZ), and Strontium and Magnesium doped Lanthanum Gallate (LSGM).

An electrolyte solution can also include binder, solvent, dispersant, etc. as is known in the art in conjunction with the electrolyte material. Examples of typical components as may be incorporated in an electrolyte solution include those as are described above with regard to the electrode material slurry containing compositions. In addition, the electrolyte solution can include the same binder, solvent, etc. as the electrode slurry or may include different components, as desired.

Following simultaneous or sequential sintering of the precursor electrolyte layer 38 and the coagulated precursor tube 30, during which the sublayers (e.g., 37, 36, 35 and a portion of 34) formed of the sacrificial material 24 will be removed, a second electrode layer 52 can be formed on the sintered electrolyte layer 42. The second electrode layer 52 can be formed from a precursor composition that includes the electrode material in conjunction with binder, solvent, etc. as is known in the art, examples of which are discussed above. The second electrode composition (e.g., an electrode composition including a cathode material) can be applied to the sintered electrolyte layer 42 according to any suitable process including, without limitation, dip coating and brush painting, etc. Upon sintering of the second electrode layer 52, the solid oxide cell 50 can include the first electrode layer 44 and the second electrode layer 52 separated by an electrolyte layer 42. The sintered second electrode layer 52 can generally have a wall thickness of about 30 micrometers or less, for instance about 20 micrometers or less in some embodiments, or about 15 micrometers or less in some embodiments.

Figure 4:
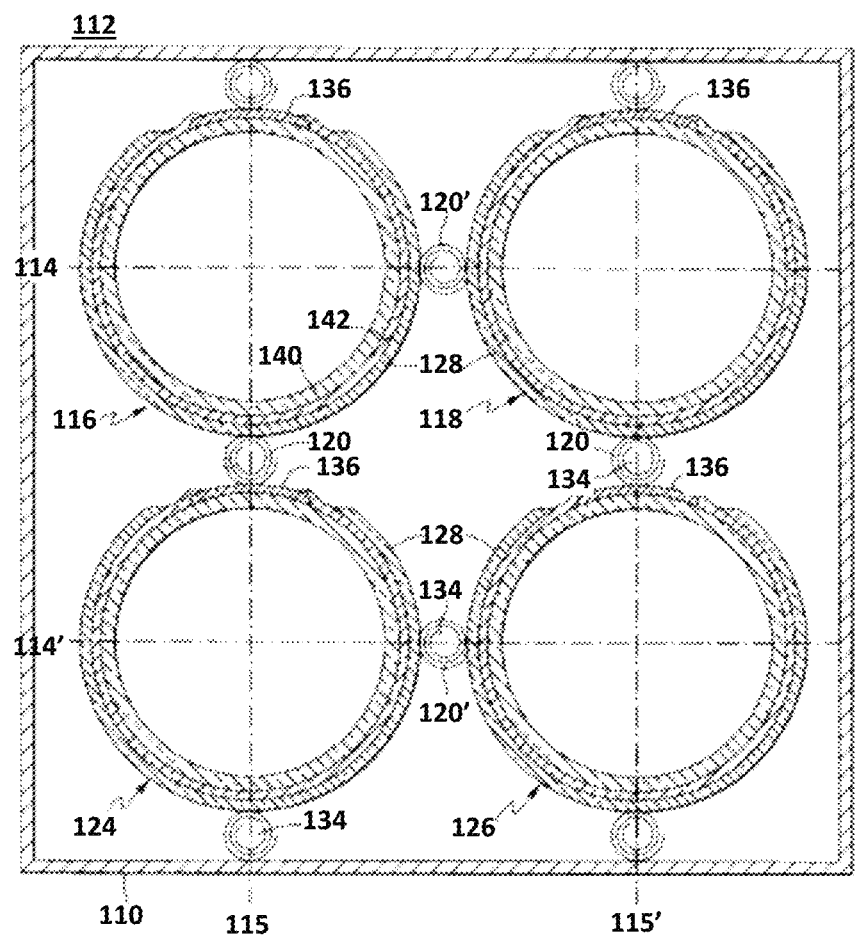
FIG. 4 is a cross sectional view of one embodiment of a fuel cell stack assembly.

A plurality of tubular solid oxide cells can be combined according to standard practice to form an array of solid oxide cells. By way of example, FIG. 4 illustrates a two by two cell array of tubular fuel cells in a plenum 110 of a generator 112. The array comprises rows of fuel cells, such as, for example, a first row 114 including individual tubular fuel cells 116 and 118, which are electrically connected in parallel by hollow, rolled electrically conducting member (conductor) 120'. Fuel cells 116 and 118 are also electrically connected in series (in columns 115 and 115') with the fuel cells in the adjacent second row 114', including fuel cells 124 and 126, by the conductor 120, which contacts their outer electrodes 128 and the interconnection layer 136. Both conductors 120 and 120' are shown loosely coiled for illustrative purposes. Thus, the conductors connect the fuel cells in series and in parallel.

The conducting members 120 and 120' can be a thin sheet of porous mesh, rolled on itself to form plural layers bonded at the end. Of course, a single roll could be used if of an appropriate thickness and any other means suitable to hold the shape of the rolled mesh can be substituted. The conductors 120 and 120' are shown loosely rolled (for illustrative purposes), but will be tightly coiled in actual use, so that all the layers intimately contact each other. Also shown is the hollow, axially elongated, unfilled volume 134 between the interconnect material 136 and the outer electrodes 128.

All of the fuel cells include an inner self-supported electrode layer 140 (e.g., an anode), a solid electrolyte layer 142, an outer electrode layer 128 and an outer interconnection layer 136, which physically and electrically contacts the outer electrode, as shown in FIG. 4. All of the interconnection layers 136 of the second row 114' of cells face all of the outer electrodes 128 of the first row 114 of cells. Thus, the interconnection of cell 124 will face the outer electrode of cell 116 within the column 115 of cells.

The present disclosure may be better understood with reference to the Example set forth below.

Example

Materials and Synthesis Methods

Commercial NiO (Fine grade, FCM, USA) and SDC ($Ce_{0.8}Sm_{0.2}O_{1.9}$ Tape cast grade, FCM, USA) anode powders were mixed in a weight ratio of 6:4 by ball milling. Graphite powder (MCMB, MTI Corporation, USA) was used as the sacrificial layer material during the co-extrusion of an anode substrate. Polyethersulfone (PESf) (Veradel 3000P, Solvay Specialty Polymers, USA) with a molecular weight of ~3000 g $mol^{-1}$, N-methyl-2-pyrrolidone (NMP) (HPLC grade, Sigma-Aldrich, USA), and polyvinylpyrrolidone (PVP) (K30, CP, Sinopharm Chemical Reagent Co., China) with a molecular weight of 4000 g $mol^{-1}$ were used as the polymer binder, the solvent, and the dispersant, respectively, to prepare an organic solution. Tap water was used as the internal and external coagulant, and all preparation processes were carried out at room temperature. $PrBaCo_2O_{5+\delta}$ (PBCO) powder was synthesized using the Pechini process with $Pr_6O_{11}$, $Ba(NO_3)_2 \cdot 9H_2O$ and $Co(NO_3)_2 \cdot 6H_2O$ as precursors, followed by calcinations at 1100° C. for 5 h. Fine PBCO powders were ground with α-terpineol (Alfa Aesar, USA) to form a cathode ink.

Micro-Tubular SOFC Fabrication

The NiO-SDC composite micro-tubular anode substrates precursors were prepared, followed by the fabrication of NiO-SDC/SDC/PBCO cells. Specifically PVP and PESf were dissolved in NMP to form an organic solution. NiO-SDC powders were added into the solution, which was stirred for 48 h to form a homogeneous spinning slurry. Graphite slurry was prepared using the same procedure. The compositions of the slurries are provided in Table 1, below. A graphite slurry was prepared, while three NiO-SDC slurries with different compositions were prepared for the purpose of comparison. Prior to extrusion, these slurries were degassed for 10 min to remove trapped air bubbles.

TABLE 1

| Layer | Composition (wt %) | | | | |
|---|---|---|---|---|---|
| | NMP | PESf | PVP | NiO/SDC | graphite |
| Inner | 42.0 | 7.0 | 1.0 | — | 50.0 |
| Outer | 16.8 | 2.8 | 0.4 | 80.0 | — |
| | 21.0 | 3.5 | 0.5 | 75.0 | — |
| | 25.2 | 4.2 | 0.6 | 70.0 | — |

The spinning NiO-SDC and graphite slurries were loaded into the outer and inner chambers, respectively, of a stainless steel spinneret as illustrated in FIG. 2. Tap water was used as the internal coagulant through the central channel of the mold. NiO-SDC slurry and graphite slurry as well as water as internal coagulant were drawn simultaneously through a triple orifice spinneret at the bottom of the mold.

Figure 5:
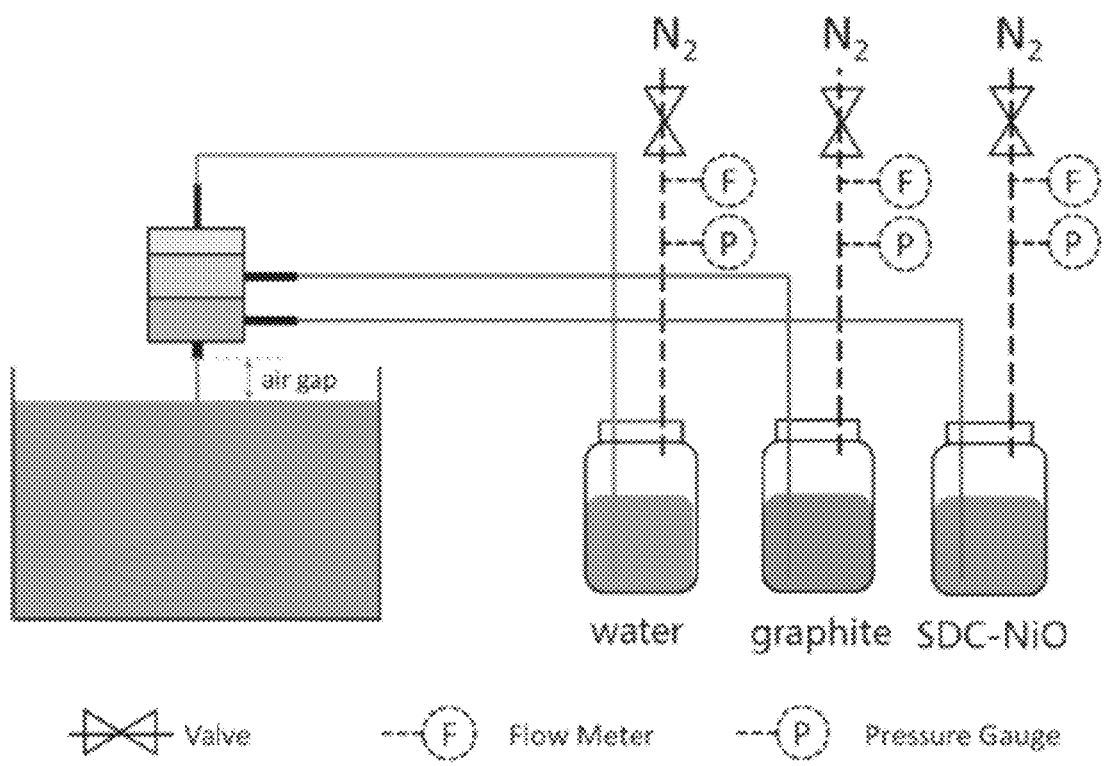
FIG. 5 is a schematic illustration of a co-extrusion system for fabrication of a dual-layer micro-tubular anode substrate.

The flow rates of the slurries and internal coagulant were controlled by flow meters (Seven Star, China) in combination with a pressurized nitrogen gas system as illustrated in FIG. 5. The distance between the spinneret orifice and a water bath was controlled at 5 mm. Detailed extrusion parameters are provided in Table 2. The extruded micro-tubular green bodies were left in water bath for 24 h, allowing for the phase inversion. In the early phase of phase inversion, the early stage relatively fast exchange between the water anti-solvent and the NMP solvent led to the formation of the finger-like pores in the sublayers. Solidification occurred due to decrease of solvent concentration in the slurry. This solidification process was believed to be relatively slow and mainly occurred at the later stage of the phase inversion process. Following phase inversion, the micro-tubular green bodies were cut and dried at room temperature prior to application of an electrolyte layer.

TABLE 2

| Parameters | Values |
|---|---|
| Air gap (mm) | 5.0 |
| Room Temperature (° C.) | 20.0 |
| $N_2$ pressure for inner coagulant (bar) | 0.5 |
| Estimated inner coagulant flow rate (mL/min) | 5.0 |
| $N_2$ pressure used for graphite slurry (bar) | 3.0 |
| Estimated graphite slurry flow rate (mL/min) | 7.0 |
| $N_2$ pressure used for NiO/SDC slurry (bar) | 3.0 |
| Estimated anode slurry flow rate—80% NiO/SDC (mL/min) | 5.2 |
| Estimated anode slurry flow rate—75% NiO/SDC (mL/min) | 6.9 |
| Estimated anode slurry flow rate—70% NiO/SDC (mL/min) | 8.8 |

The composition of the SDC electrolyte solution is shown in Table 3. The SDC solution was mixed and ball-milled for 7 days before use. Dual-layer anode substrate precursor was sealed at both ends using PTFE films. The sealed substrate precursor was immersed into the SDC solution for 5 minutes and then dried in air at room temperature. The coating procedure was repeated for 10 times. The dual-layer anode substrate precursors and coating of SDC electrolyte were then sintered at 1450° C. for 5 h with a heating and cooling rate of 3° C./min to form a thin film dense electrolyte and a half-cell. Cathode ink was then brush-painted onto the SDC electrolyte thin film, followed by firing at 1000° C. for 3 h to form a single cell. The active cathode area was ~0.23 $cm^2$.

TABLE 3

| Component | Weight % |
| --- | --- |
| SDC | 10.0 |
| Ethanol (solvent) | 87.5 |
| Triethanolamine (dispersant) | 1.0 |
| Di-n-butyl phthalate (plasticizer) | 0.5 |
| Polyethylene glycol, M.W. 300 (plasticizer) | 0.5 |
| Polyvinyl butyral (binder) | 0.5 |

For comparison, a phase inversion based single layer extrusion method (without a graphite layer) was employed to prepare an anode substrate, followed by dip-coating electrolyte and painting cathode with the same processes as described above.

For gas permeation characterization, the NiO-SDC micro-tubular green anode substrates were sintered at 1450° C. for 8 h in air, some of the sintered anode substrates were also reduced at 600° C. for 5 h in humidified $H_2$.

In the following description, the cells fabricated with the dual-layer coextrusion method are referred to as disclosed cells, those fabricated with single layer extrusion method are denoted as conventional cells.

Characterizations and Electrochemical Measurements

The synthesized PBCO cathode material was characterized by a powder X-ray diffraction (XRD) with Cu-Kα radiation (D/MAX 3C). The microstructure of the prepared micro-tubular precursors and single cells were characterized using scanning electron microscopy (SEM, Zeiss Ultra Plus FESEM, Germany).

To measure the gas permeability of the Ni-SDC anode substrate. The sample was sealed at one end by epoxy resin and supported at the other end by a connector with epoxy resin, enclosed by a stainless steel cylinder at the symmetrical central line. As a result, a chamber was formed between the sample and the cylinder. Nitrogen gas was fed into the sample of the micro-tubular substrate at various transmembrane pressures. The flux of the permeated nitrogen through the sample into the chamber was measured using a soap bubble flow meter. The permeation measurements were carried out for both unreduced anode substrate and reduced substrate.

Figure 6A:
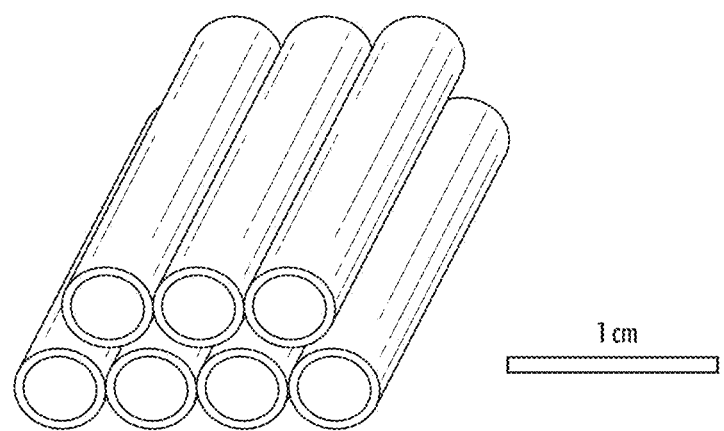
FIG. 6A illustrates a plurality of electrode precursors.
Figure 6B:
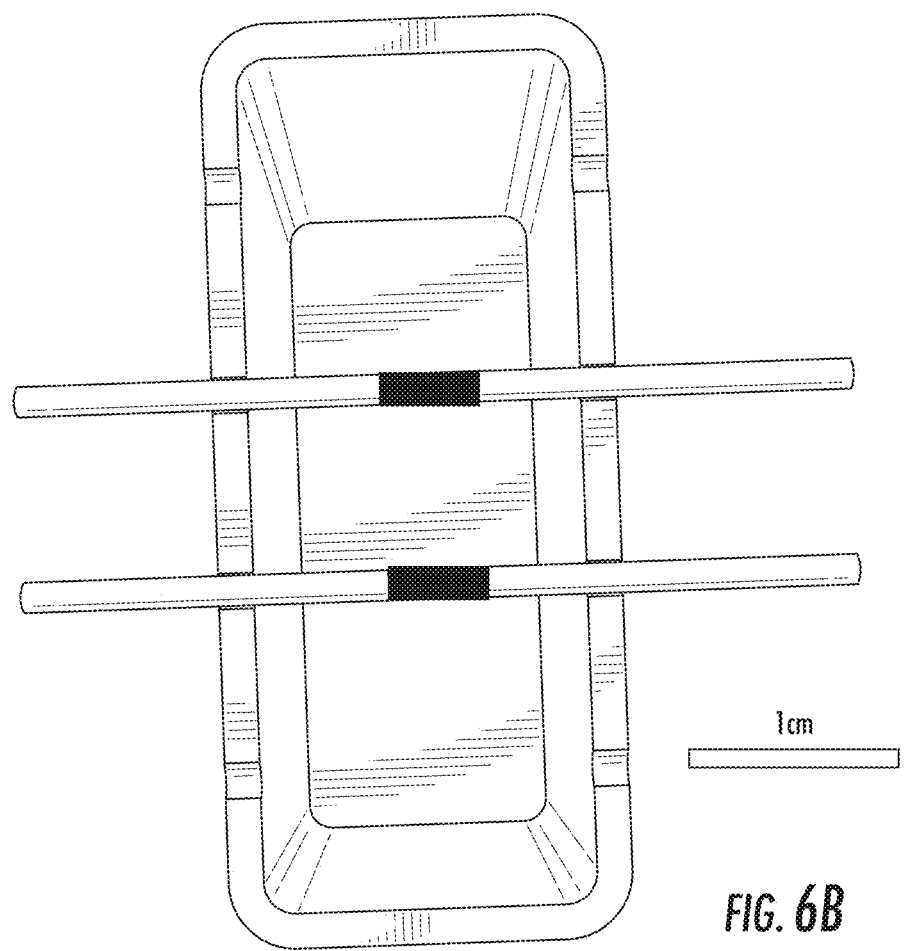
FIG. 6B illustrates two fabricated single solid oxide cells.
Figure 6C:
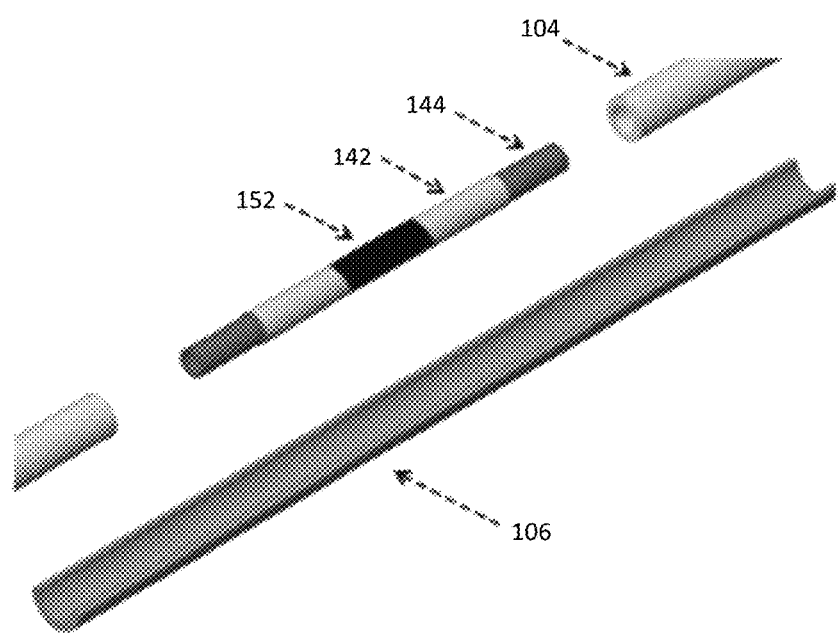
FIG. 6C is shown an exploded view of a test stand set-up used for electro-chemical examination of a cell.
Figure 6D:
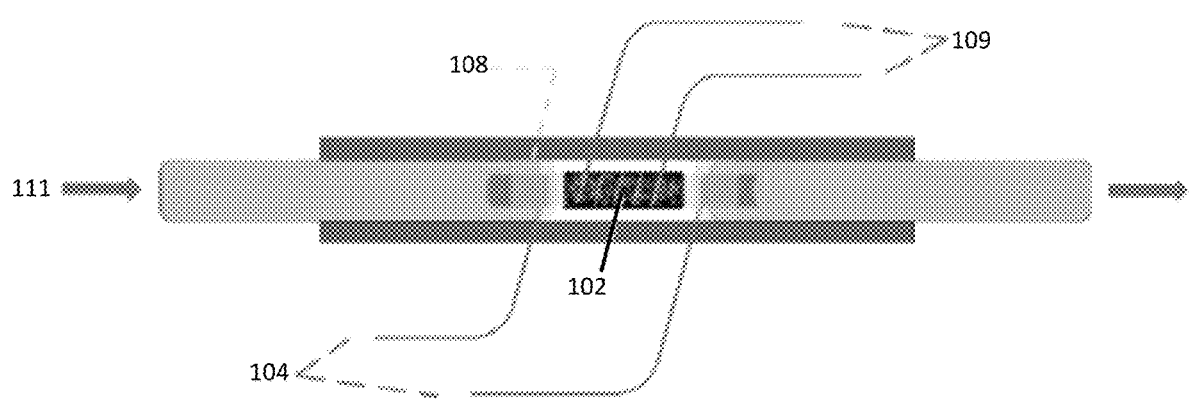
FIG. 6D is a top view of a test stand set-up used for electro-chemical examination of a cell.

For the electrochemical measurements, fabricated single cells, shown in FIG. 6A and FIG. 6B, were tested from 500° C. to 600° C. with humidified hydrogen as fuel and static air as oxidant. The testing system is shown in FIG. 6C and FIG. 6D in which a cell including a co-axial cathode 152, electrolyte layer 142, and anode 144 was held in an alumina tube 104 and supported with an alumina half tube 106 as shown. Silver paste was painted onto the cathode as a current collector 102. Silver wire 109 was wound around the cathode and at either end of the anode substrate as connection and a ceramic sealant 108 was used to retain the fuel flow 111 within the cell. The temperature of the cell was controlled using a tube furnace (MTI). The flow rate of fuel was controlled at 10, 20 and 30 mL min$^{-1}$ respectively using a precision flow meter (APEX). The voltage-current (V-I) and electrochemical impedance spectra (EIS) were measured using a Solartron 1260/1287 electrochemical workstation. The EIS measurements were performed with a voltage perturbation of 10 mV over the frequency range from 0.01 Hz to $10^5$ Hz, under open circuit voltage conditions and different working voltages.

XRD Pattern of as-Prepared PBCO Powder

X-ray diffraction (XRD) pattern of PBCO calcined at 1000° C. for 5 h exhibited characteristic peaks correspond to the layered perovskite structure, and closely match the PDF card of $PrBaCo_2O_{5.68}$ (JCPDS #53-0131). No characteristic peaks corresponding to other phases could be found. The diffraction peaks were narrow and sharp, indicating the synthesized PBCO was well crystallized.

Microstructures of the Co-Extruded Micro-Tubular Substrates

Figure 7A:
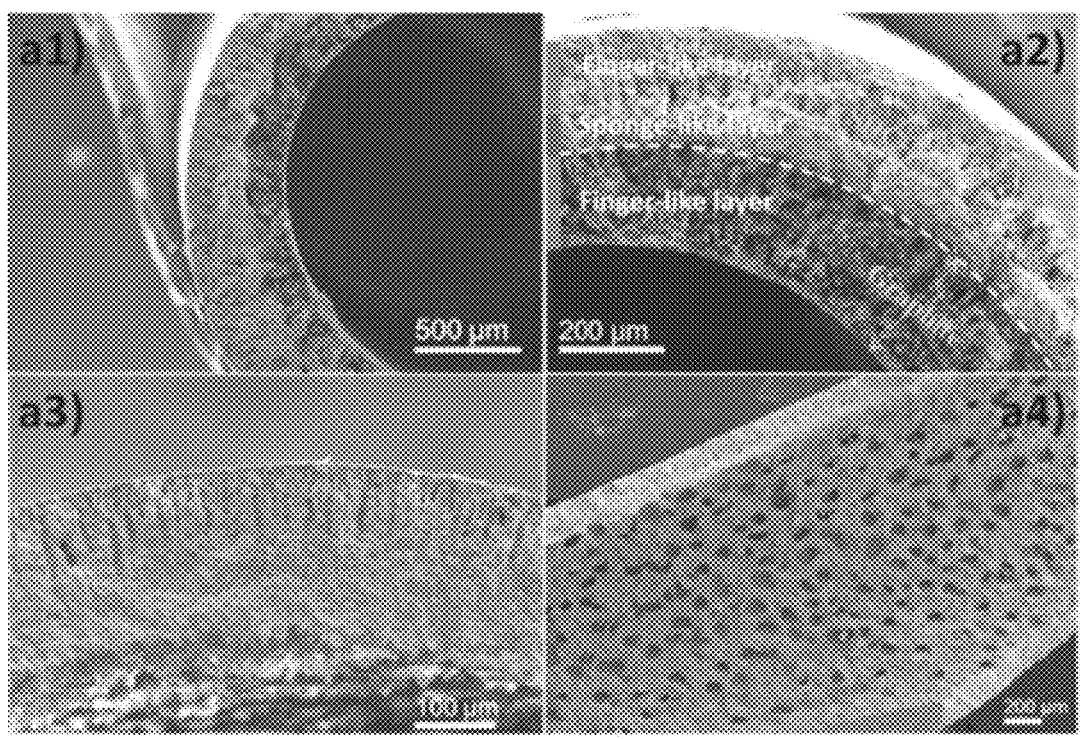
FIG. 7A presents SEM images of a micro-tube formed according to disclosed methods including a cross-section of multi-layer co-extruded precursors (a1), partial enlarged details of the precursors (a2), cross-section following sintering (a3), and inner surface following sintering (a4).
Figure 7B:
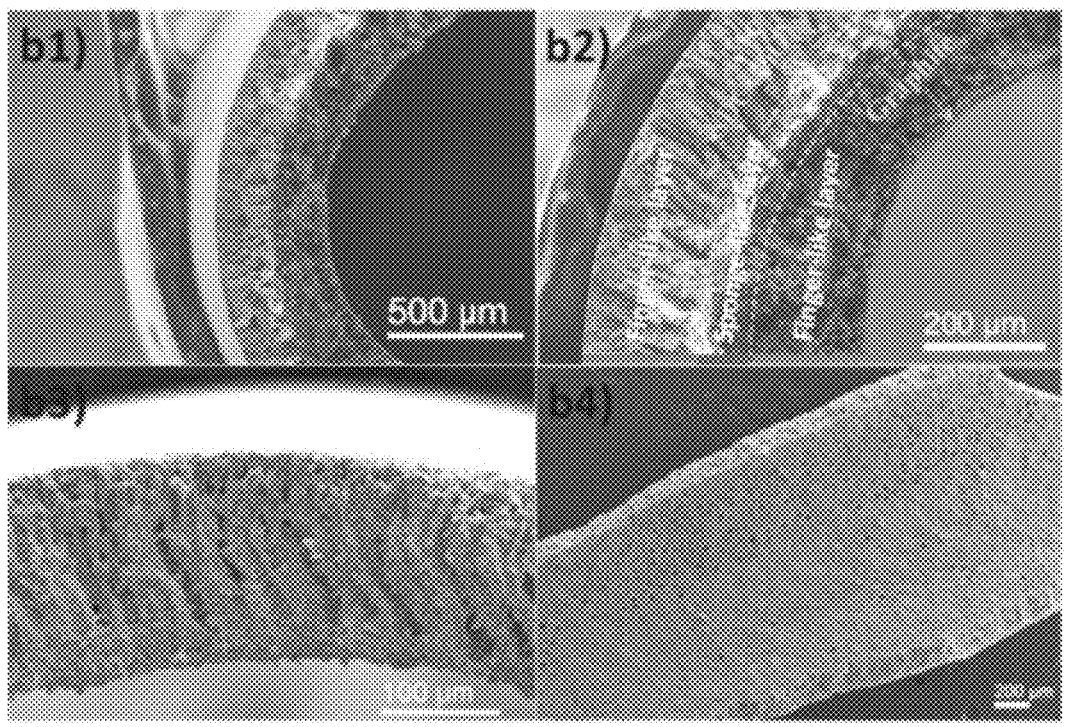
FIG. 7B presents SEM images of another micro-tube formed according to disclosed methods including a cross-section of multi-layer co-extruded precursors (b1), partial enlarged details of the precursors (b2), cross-section following sintering (b3), and inner surface following sintering (b4).
Figure 7C:
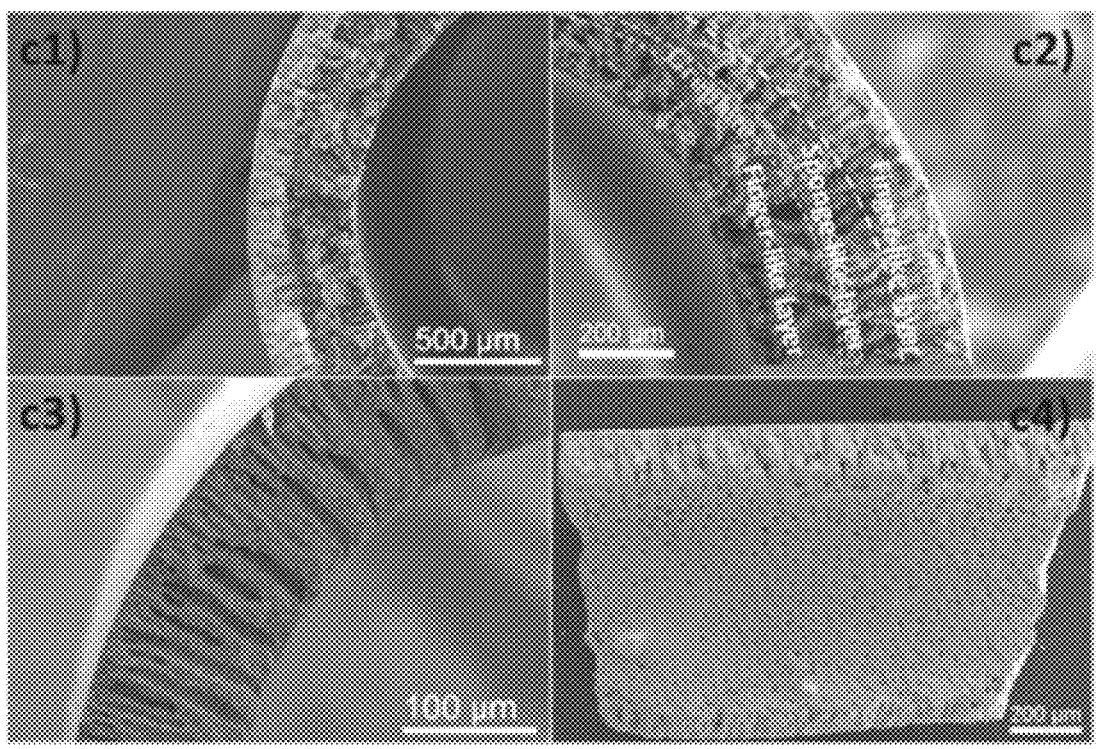
FIG. 7C presents SEM images of another micro-tube formed according to disclosed methods including a cross-section of multi-layer co-extruded precursors (c1), partial enlarged details of the precursors (c2), cross-section following sintering (c3), and inner surface following sintering (c4).

The exchange process of water and NMP molecules formed multi-layered microstructures within the dual-layer micro-tube in the following order: outer surface skin layer/finger-like layer/sponge-like layer/finger-like layer/inner surface skin layer (FIG. 7A at a1 and a2). Three MT substrate samples were prepared using three differently loaded compositions of NiO-SDC slurries (as shown in Table 1). The cross-sectional views of the green bodies are shown in FIG. 7A at a1 and a2; FIG. 7B at b1 and b2; and FIG. 7C at c1 and c2. When the solid content of NiO-SDC was relatively high, e.g., 80 wt. %, the rate of solvent/water exchange from the tube outer surface was relatively low, the sponge-like layer was confined within the NiO-SDC layer (FIG. 7A at a2). When the solid content of NiO-SDC was reduced to 75 wt. %, the solvent/water exchange rate was improved, pushing the sponge-like layer to the NiO-SDC/graphite interface (FIG. 7B at b2). When the solid content of NiO-SDC was further reduced to 70 wt. %, the sponge-like layer was further pushed into the graphite layer (FIG. 7C at c2).

Upon firing the micro-tubular green body, the graphite sacrificial layer was burnt out, leaving the porous NiO-SDC layer. It was observed that the relative location of the sponge-like layer was important in determining the microstructure of the resultant NiO-SDC substrate. For instance, for the substrate illustrated in FIG. 7A at a1 and a2, upon firing and the removal of the graphite layer (FIG. 7A at a3), open pores were created at the internal surface of the NiO-SDC micro-tube (FIG. 7A at a4). Unfortunately, the sponge-like layer (having a closed porosity) was still in the NiO-SDC layer, blocking the more open finger-like microchannels in NiO-SDC substrate (FIG. 7A at a3). In the case of the sample illustrated in FIG. 7B, because the sponge-like layer was at the NiO-SDC/graphite interface, after removing the graphite layer (FIG. 7B at b3), the finger-like microchannels in the NiO-SDC layer were still partially blocked by the internal surface of NiO-SDC micro-tube. This can be seen from FIG. 7B at b4. In the case of the sample illustrated in FIG. 7C, after the graphite layer was eliminated through firing, the sponge-like layer in the graphite layer was completely eliminated (FIG. 7C at c3), leaving the open pores on the internal surface (FIG. 7C at c4) and forming a microchannel array well aligned radially in the NiO-SDC micro-tubular substrate. It is expected that such a micro-tubular substrate with more open microstructure can significantly improve fuel/gas diffusion and electrochemical performance of the cell.

Gas Permeability of the Microtubular Substrate

Figure 8A:
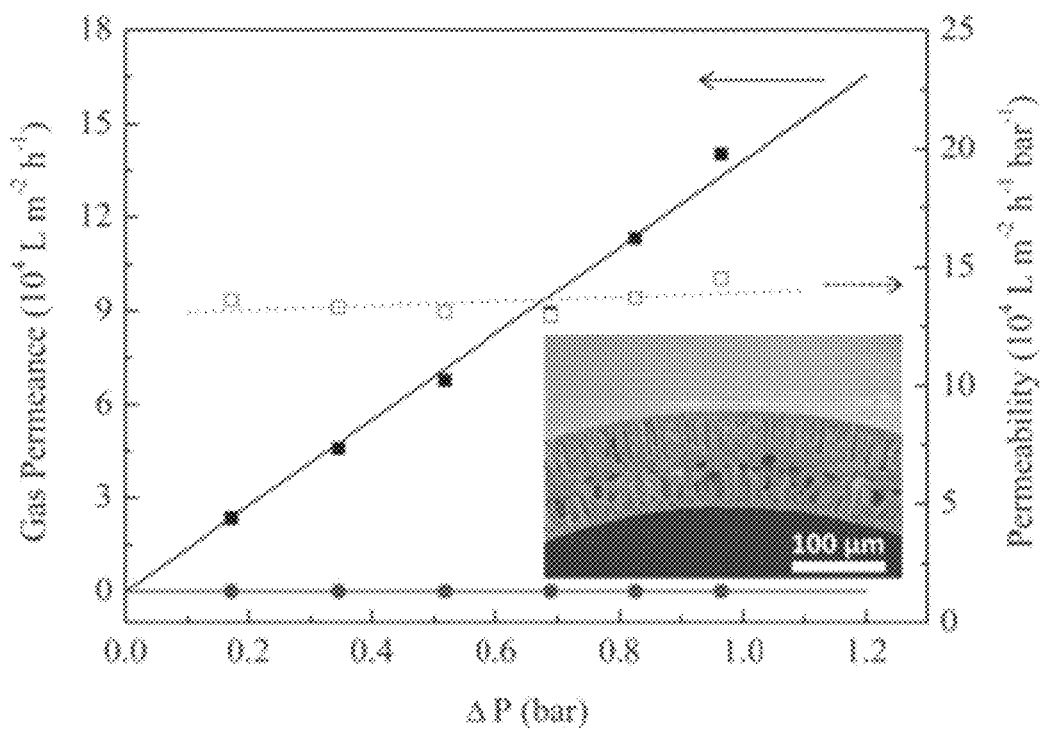
FIG. 8A compares gas permeability of micro-tubes formed as disclosed herein to conventionally formed tubes following sintering.
Figure 8B:
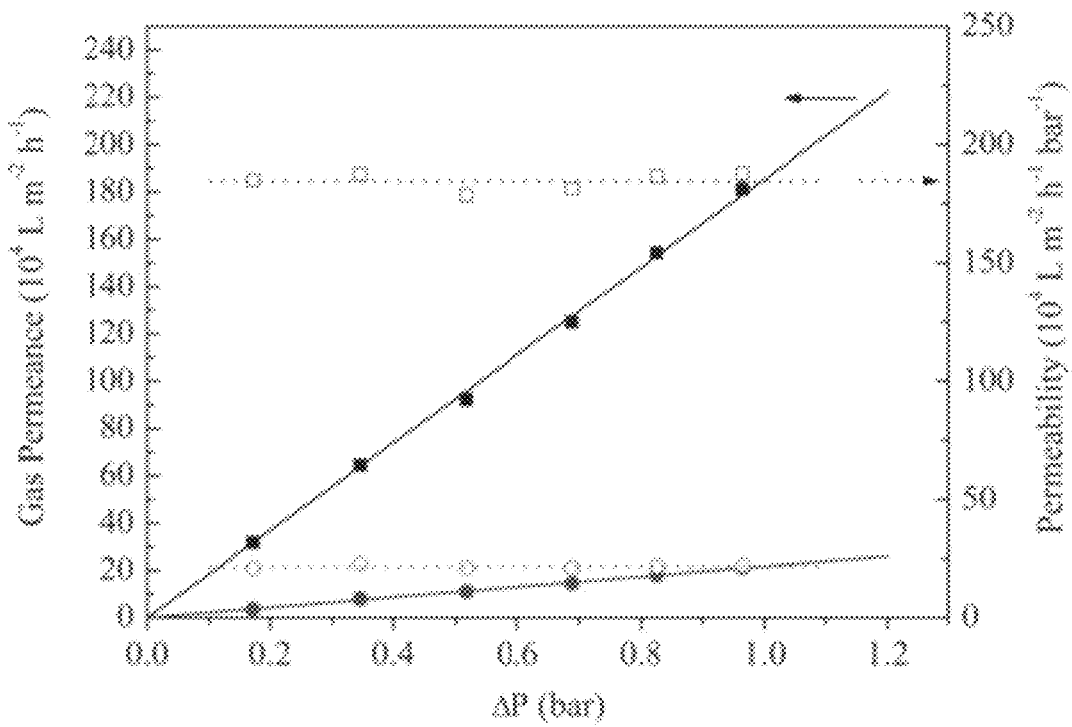
FIG. 8B compares gas permeability of micro-tubes formed as disclosed herein to conventionally formed tubes following sintering and post-sintering reduction.

To determine gas permeability of the micro-tubular substrate, the NiO-SDC micro-tubular precursors were first sintered at 1450° C. for 5 h in air and then reduced at 600° C. for 5 h in humidified $H_2$. The gas permeability of the sintered NiO-SDC micro-tubular substrates was measured before and after the reducing treatment. As a comparison, NiO-SDC micro-tubular precursors were also prepared using a phase inversion-based single layer extrusion method, in which the sponge-like layer was sandwiched by finger-like layers on either side (insert of FIG. 8A). These conventional micro-tubular precursors were sintered and reduced under the same conditions as those of the co-extruded micro-tubular precursors. The gas permeability testing results are shown in FIG. 8A and FIG. 8B. As shown, the sintered dual-layer co-extruded micro-tubular substrate before reducing treatment exhibited permeability of ~13.5× $10^4$ L m$^{-2}$ h$^{-1}$ bar$^{-1}$ (FIG. 8A). It was not surprising to see that the permeability of the sintered conventional micro-tubular substrate was almost zero, indicating that the middle sponge-like layer was almost gas-tight after sintering (insert of FIG. 8A). After a reducing treatment at 600° C. for 5 h in humidified $H_2$, the gas permeability of both the co-extruded and single layer extruded NiO-SDC micro-tubular substrates were improved due to the fact that the NiO was reduced to Ni, leading to increased porosity. Specifically, the permeability of the conventional micro-tubular substrate was ~20× $10^4$ L m$^{-2}$ h$^{-1}$ bar$^{-1}$. The permeability of the disclosed micro-tubular substrate increased to 180×$10^4$ L m$^{-2}$ h$^{-1}$ bar$^{-1}$, 9 times that measured for the conventional substrate.

Microstructure of the Anode-Supported MT-SOFC

Figure 9A:
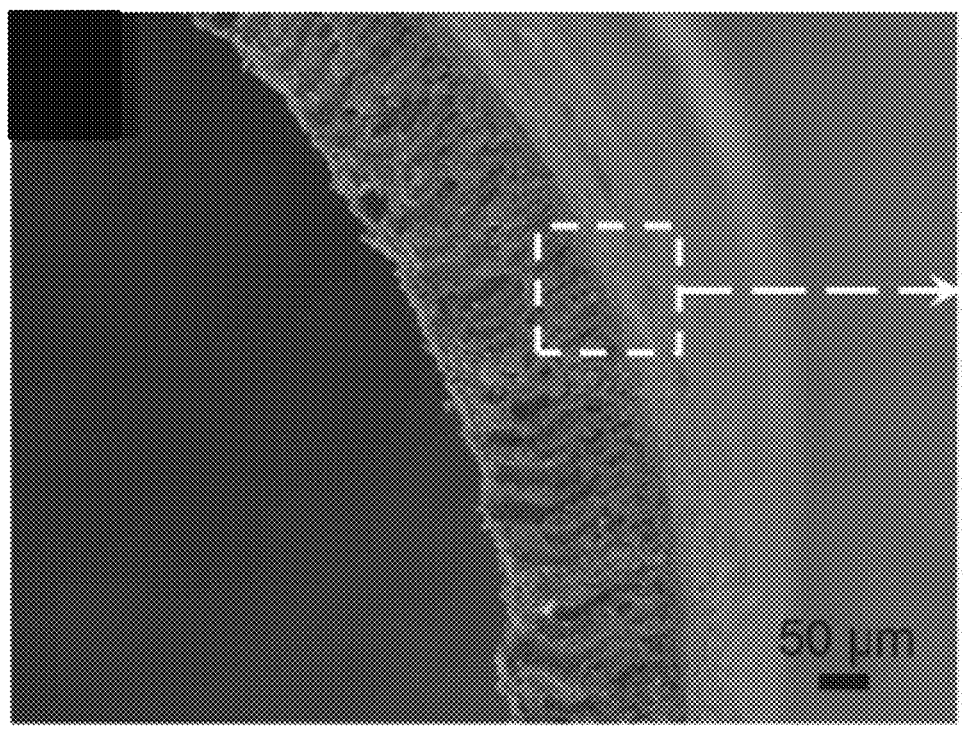
FIG. 9A illustrates the microstructures of a solid oxide cell in cross section.
Figure 9B:
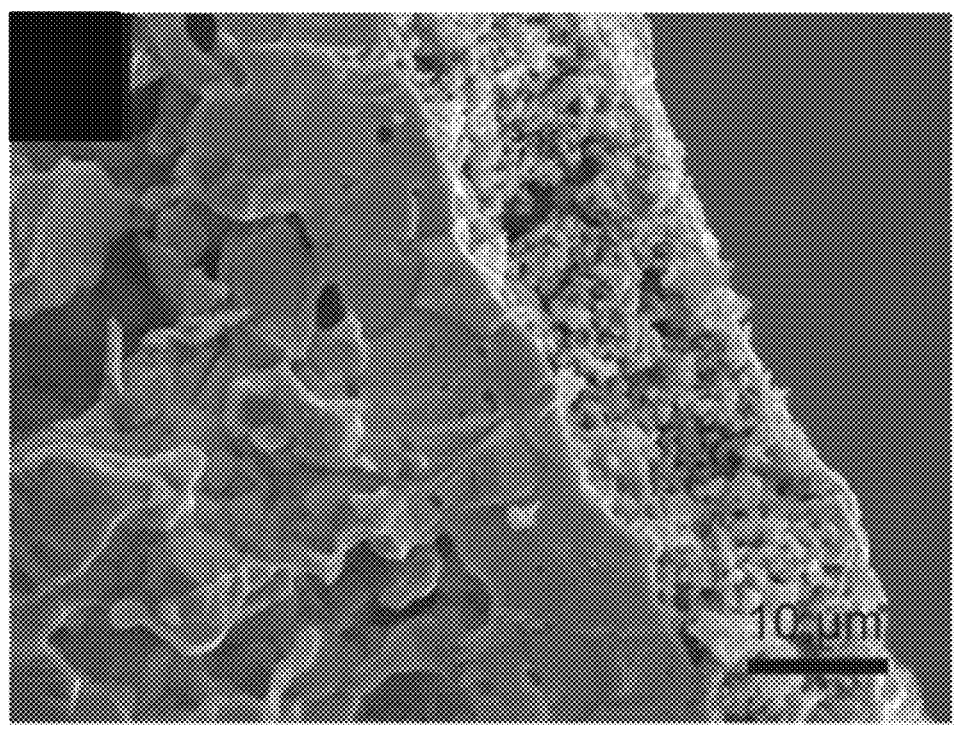
FIG. 9B illustrates the cell cross section near the electrode/electrolyte interface.

Micro-tubular SOFCs were fabricated via the extruded dual-layer method as described using an anode slurry having a 70 wt. % solid content. FIG. 9A shows a cross-sectional image of a single cell. An enlarged image near the anode/electrolyte interface is shown in FIG. 9B. The SDC electrolyte was dense with a thickness of about 10 μm and showed intimate contact with the anode substrate. The PBCO cathode had uniform thickness of about 12 μm and also appeared to have intimate contact with the electrolyte layer.

Electrochemical Performance of the MT-SOFCs

Figure 10A:
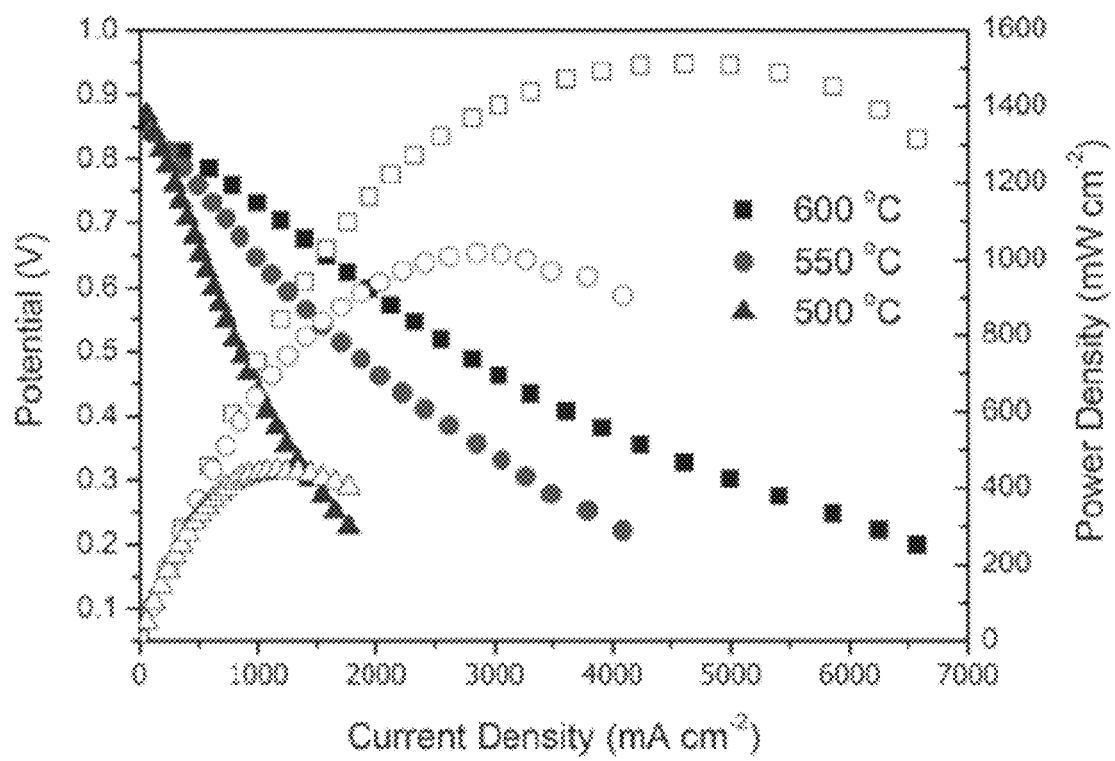
FIG. 10A compares the electrochemical performance at different temperatures of solid oxide cells formed as disclosed herein.

The electrochemical performance of the fabricated MT-SOFCs was tested at 500, 550, and 600° C., respectively. The humidified $H_2$ was used as the fuel and static air as the oxidant. The flow rate of $H_2$ supply was controlled at 30 mL/min. FIG. 10A shows the I-P & I-V curves of the inventive cell. The open circuit voltage (OCV) reached about 0.89 V-0.85 V at 500° C.-600° C., which were comparable to those of the planar cells with SDC electrolyte, but much higher than those of MT-SOFCs with thin SDC electrolyte in open literature. The OCV of the cell slightly decreased with increasing operating temperatures. An ideal electrolyte should be a pure ionic conductor. However, SDC is known to exhibit mixed electronic-ionic conductivity and a slight electronic current may exist through the SDC electrolyte in short-circuit pathways, leading to current leakage and decreased OCVs. Increasing temperatures nant. The cell demonstrated peak power densities of 1484 mW cm$^{-2}$, 1036 mW cm$^{-2}$ and 439 mW cm$^{-2}$ at 600, 550 and 500° C., respectively.

Figure 10B:
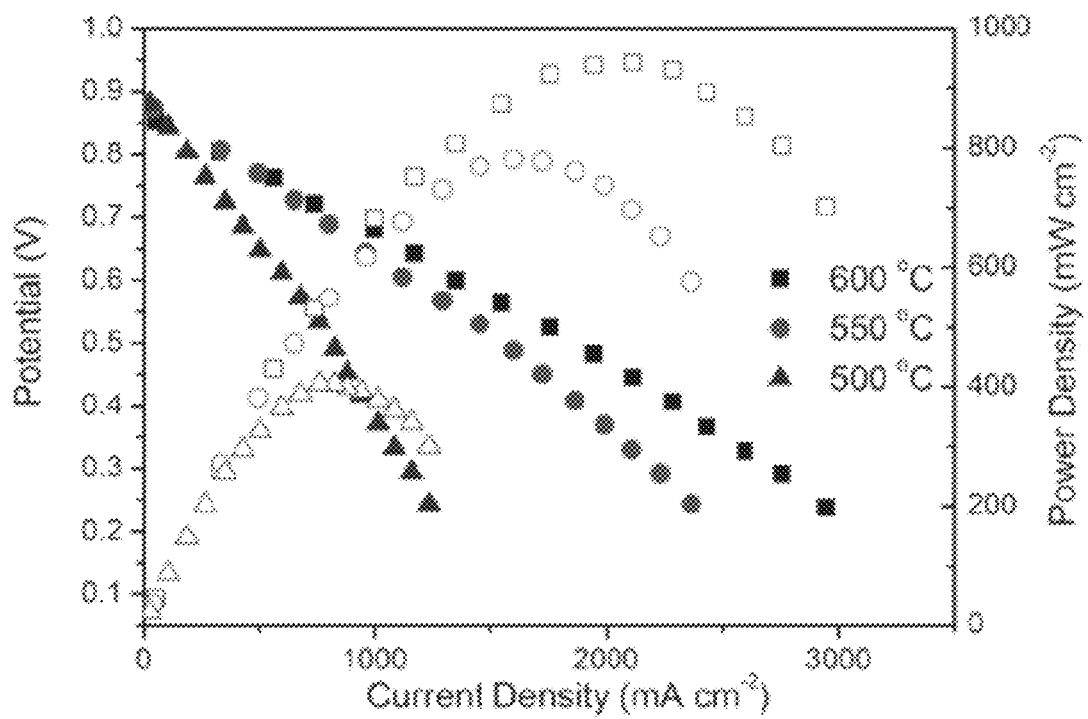
FIG. 10B compares the electrochemical performance at different temperatures of solid oxide cells formed via a single layer extrusion method.

By contrast, the peak power densities of MT-SOFC prepared using the conventional phase-inversion method (FIG. 10B) were 954 mW cm$^{-2}$, 782 mW cm$^{-2}$ and 392 mW cm$^{-2}$ at 600, 550 and 500° C., respectively, significantly lower than those of the disclosed cell. Since the conventional MT-SOFC is the same as the disclosed cell in material system and fabrication processes except for the preparation of the anode substrate, it is reasonable to assume that the microstructure of the anode substrates led to the difference in electrochemical performance. Since the gas permeability measurements indicate the co-extruded anode substrates were about 9 times that of single layer extruded anode substrate, the more open porous microstructure of the anode substrate likely contributes to the improved performance of the disclosed cell over the conventional one. In fact, the V-I curves of the conventional cell showed a slight bending-down in the range of high current densities (FIG. 10B). This observation indicates that the fuel/gas diffusion process could be a potential limiting factor, leading to further evidence that the performance difference may be due to the differences in microstructure.

Figure 11A:
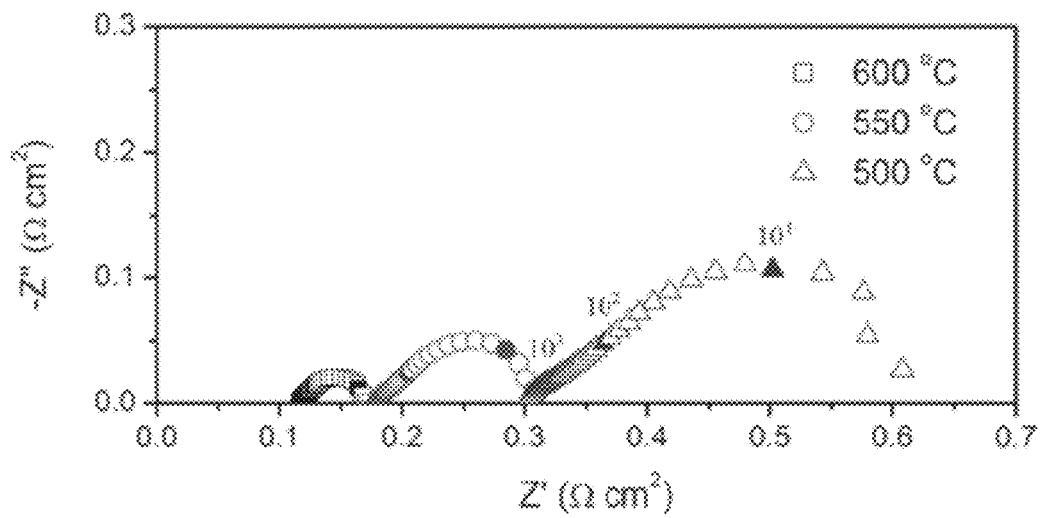
FIG. 11A compares the impedance spectra under OCV conditions at different temperatures of solid oxide cells formed as disclosed herein.
Figure 11B:
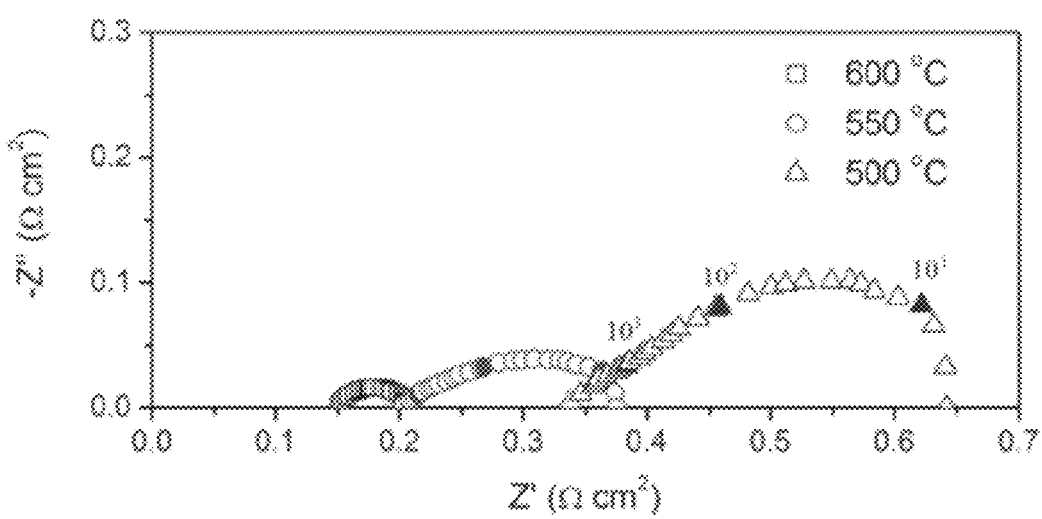
FIG. 11B compares the impedance spectra under OCV conditions at different temperatures of solid oxide cells formed via a single layer extrusion method.

FIG. 11A and FIG. 11B display electrochemical impedance spectra (EIS) of cells measured under open circuit voltage conditions for cells formed according to the disclosed methods and cells formed according to a conventional single extrusion process, respectively. As shown in FIG. 11A, the cell total resistance (Rt) decreased from 0.61 to 0.17 Ω cm$^2$ and overall polarization resistance (Rp) from 0.29 to 0.05 Ω cm$^2$ with increasing the temperature from 500 to 600° C. Both ohmic resistance (Ro) and overall polarization resistance of conventional cells were a little higher than those of disclosed cells especially at the temperature of 500° C. (FIG. 11B), these also led to the improved power densities of the cells. Table 4 summarizes the performance comparisons of the cells and anode-supported NiO-SDC/SDC/PBCO SOFCs in the open literature. The Rp value 0.05 Ω cm$^2$ at 600° C. of the cell is on the lower range of the values reported in literature. The peak power density of the cell (P) is much higher than those of other cells in literature. Samples 1, 2 and 3 are described in the open literature (1—J Power Sources, 195, 7187 (2010); 2—J Power Sources, 203, 34 (2012); 3—J Power Sources, 188, 96 (2009)). Sample no. 4 was formed according to a dual layer co-extrusion as described herein, and sample no. 5 was formed according to a single layer co-extrusion.

TABLE 4

Figure 12A:
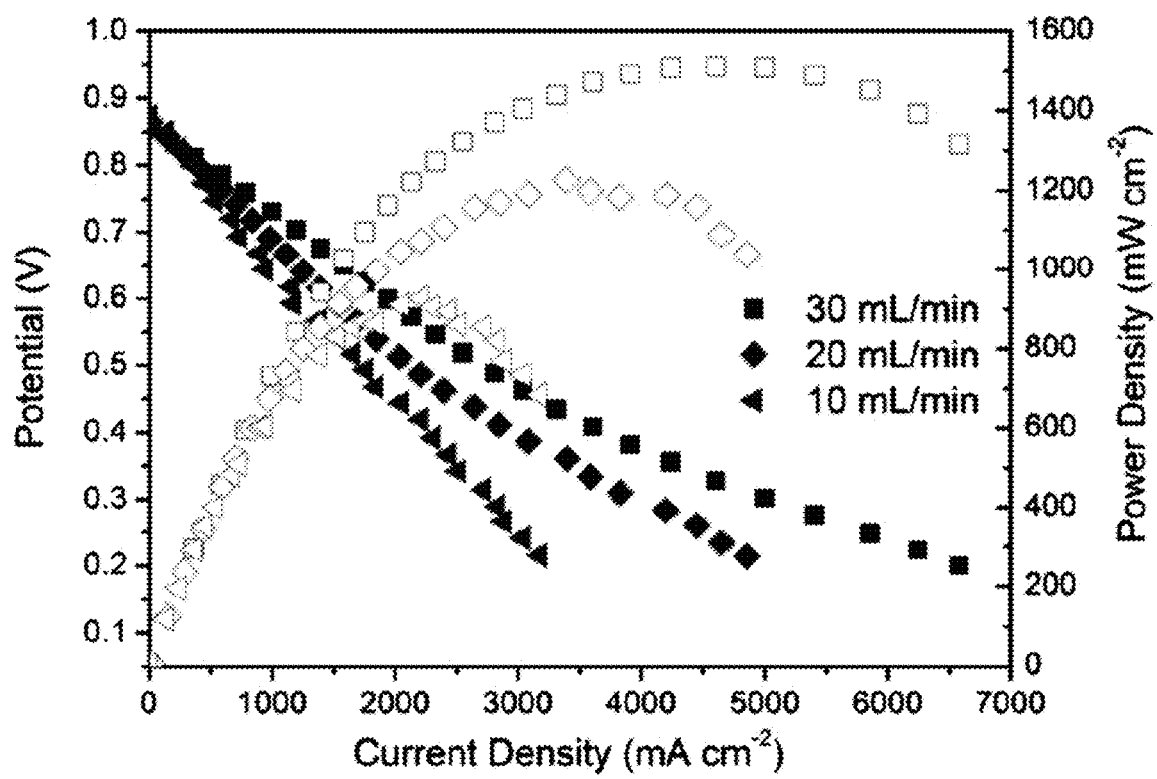
FIG. 12A compares the electrochemical performance of solid oxide cells formed as disclosed herein at different fuel feed rates.
Figure 12B:
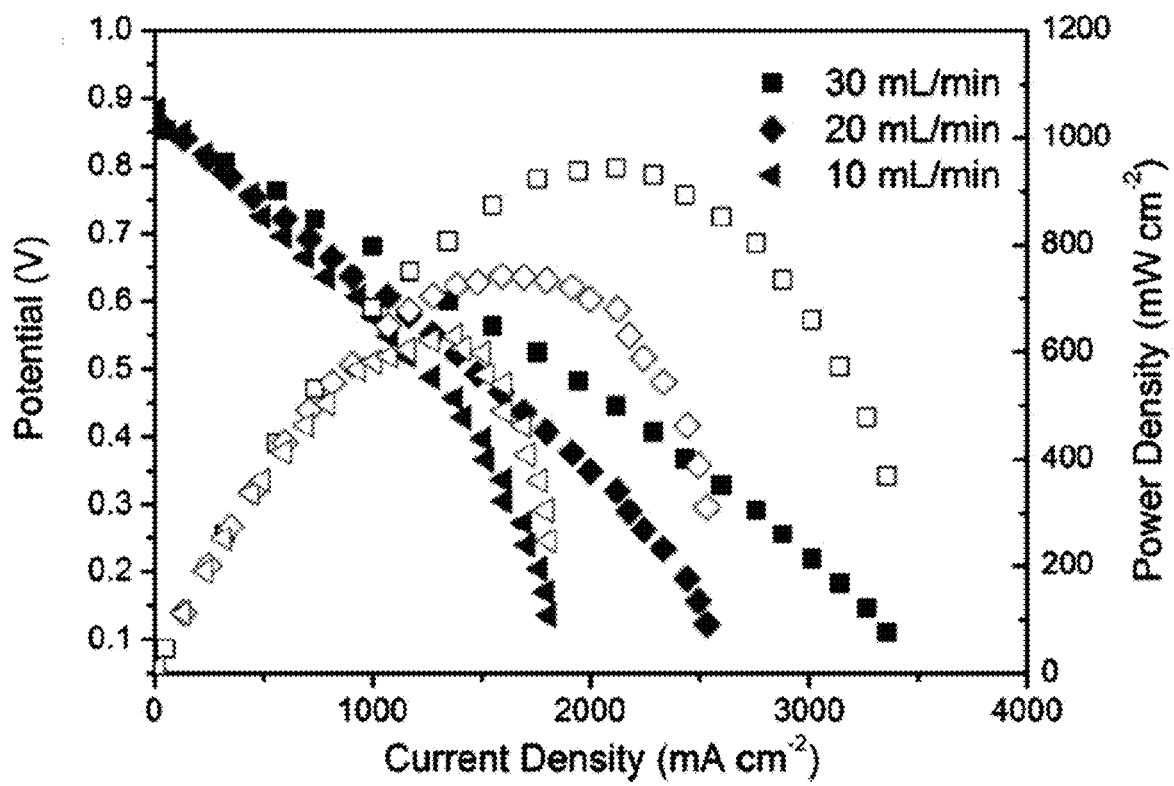
FIG. 12B compares the electrochemical performance of solid oxide cells formed via a single layer extrusion method at different fuel feed rates.

| Sample No. | $R_p$ (Ω cm$^2$) | $R_o$ (Ω cm$^2$) | P (mW cm$^{-2}$) | OCV (V) | Cell components | | | |
|---|---|---|---|---|---|---|---|---|
| | | | | | Cathode | Electrolyte | Anode | Configuration |
| 1 | 0.09 | 0.16 | 620 | 0.83 | PBCO | 20 μm SDC | Ni/SDC | Planar |
| 2 | 0.08 | 0.17 | 875 | 0.84 | SDC-PBCO | 25 μm SDC | Ni/SDC | Planar |
| 3 | 0.06 | 0.19 | 600 | 0.83 | PBCO | 26 μm SDC | Ni/SDC | Planar |
| 4 | 0.05 | 0.12 | 1484 | 0.85 | PBCO | 10 μm SDC | Ni/SDC | Micro-tubular |
| 5 | 0.06 | 0.15 | 954 | 0.85 | PBCO | 10 μm SDC | Ni/SDC | Micro-tubular | facilitates the current leakage of SDC electrolyte and may have caused the increased OCV drop. The V-I curves showed decreasing slopes in the range of relatively high current densities, indicating that concentration polarization loss induced by fuel/gas diffusion resistance was not domi-
Since the fuel/gas diffusion in the anode substrate significantly affects electrochemical performance of MT-SOFCs, it is suspected that the inlet fuel flow rate will also have significant effects on cell performance. Three inlet fuel flow rates of 10 mL min$^{-1}$, 20 mL min$^{-1}$ and 30 mL min$^{-1}$, were supplied to the anode of the cells at 600° C., the corresponding cell performance is shown in FIG. 12A and FIG. 12B for cells formed according to the disclosed methods and cells formed according to a conventional single extrusion process, respectively. Obviously, the electrochemical performance of the cell was improved when the anode inlet flow rate was increased from 10 to 30 mL min$^{-1}$. However, the behavior of the disclosed cell was different from that of conventional cells at different inlet fuel flow rates. Specifically, at relatively low inlet fuel flow rate of 10 mL min$^{-1}$, the V-I curve of the disclosed cell was a straight line, but that of the conventional cell was depressed at relatively high current densities, indicating the performance of the conventional cell at high current density was limited by concentration polarization loss. One also can notice that the V-I curve of the conventional cell was lower than that of the disclosed cell at high current densities, which is likely due to the anode diffusion limitations. When the inlet fuel flow rate was increased to 20 mL min$^{-1}$, the V-I curve of the disclosed cell became a concave line with a slight upward direction at high current densities while that of conventional cell was still lower. This observation indicates that the concentration polarization loss induced by fuel diffusion in the anode electrode limited the performance of conventional cell. This result further highlighted the significance of micro-channel array in anode substrate for facile fuel diffusion resulting in improved cell performance. When the inlet fuel flow rate was further increased to 30 mL min$^{-1}$, the cell behavior was quite similar to those at the fuel flow rate of 20 mL min$^{-1}$. Particularly, the V-I curve of the disclosed cell shows a lower voltage decline (FIG. 12A) compared to the conventional cell (FIG. 12B) at high current densities. These results indicate that the disclosed cells have smaller limitations for fuel/gas diffusion and can be operated at relatively low fuel feeding rates. In fact, the disclosed cells at the fuel flow rate of 10 ml/min reached the peak power density of about 920 mW cm$^{-2}$, which is close to that of conventional cell, about 950 mW cm$^{-2}$, at the fuel flow rate of 30 ml/min. This observation further implies that the disclosed cell may obtain higher efficiencies of both fuel utilization and energy conversion than conventional cells.

Figure 13A:
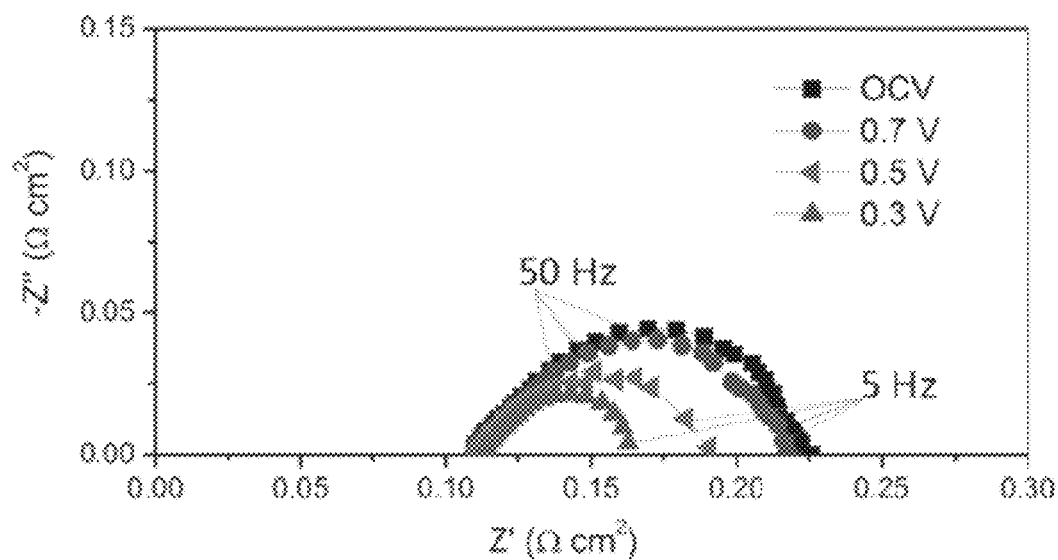
FIG. 13A compares the impedance spectra under different voltages at 600° C. with fixed fuel flux of 20 mL/min for solid oxide cells formed as disclosed herein.
Figure 13B:
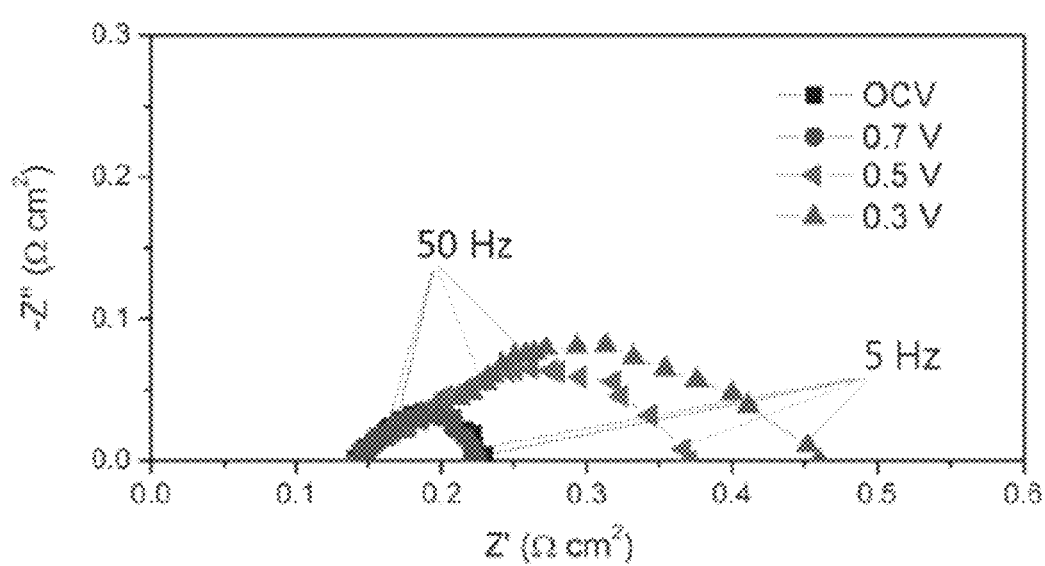
FIG. 13B compares the impedance spectra under different voltages at 600° C. with fixed fuel flux of 20 mL/min for solid oxide cells formed via a single layer extrusion method.

FIG. 13A and FIG. 13B display electrochemical impedance spectra (EIS) of the cell measured at different operating voltages under the fuel flow rate of 20 mL min$^{-1}$ for cells formed according to the disclosed methods and cells formed according to a conventional single extrusion process, respectively. As shown in FIG. 13A, the polarization resistance (Rp) of the disclosed cell decreased from 0.11 to 0.06 Ω cm$^2$ with decreasing the cell operating voltages from OCV to 0.3 V. As shown in FIG. 12A, the V-I curve under the flow rate of 20 mL min$^{-1}$ was a concave line and showed a slight upward slope. Accordingly, the slope of the V-I curve decreased with decreasing cell operating voltages. These results are consistent with above EIS results. By contrast, the overall polarization resistance of conventional cell increased from 0.10 to 0.31 Ω cm$^2$ with decreasing the cell operating voltages (FIG. 13B). Since the V-I curve of the conventional cell is a convex line (FIG. 12B), where the curve was depressed down at low operating voltages, the slope of the V-I curve increased with decreasing the cell operating voltages, which are also consistent with EIS results. It is worth noting that both of the two SOFCs are anode-supported designs, where the cathode electrodes were of nearly the same thickness and fabricated using the same technique. For this reason, the majority of the difference of the overall polarization resistances under large current density is assumed to be from the contributions of the anode. Since both cells in this study used Ni-SDC as the anode material, the microstructure difference of anode substrate is the likely contributor to the difference in polarization resistance, implying that the open micro-channel array structured anode significantly reduces the polarization resistance of the MT-SOFC. It has been recognized that the characteristic frequency range from 5 to 50 Hz in the EIS of an SOFC is related to the finite diffusion limitation. As shown in FIG. 13A, the EIS arcs in this frequency range were significantly decreased when the co-extruded cell was used, further indicating that the difference of the overall polarization resistance of the MT-SOFC, to a large extent, was contributed by the improved gas diffusion capability of the anode with micro-channel array. In other words, it might be difficult to fundamentally overcome the fuel diffusion limitations in the conventional anode substrate by simply increasing inlet fuel flow rate, or equivalently fuel partial pressure, in the anode electrode. Microstructure optimization of electrodes is a primary method to lower concentration polarization losses caused by fuel/gas diffusion limitations as demonstrated above.

The micro-channel array embedded in the anode substrate significantly improved electrochemical performance of the cell. It is expected that it can also improve fuel utilization rate and therefore system efficiency. The fuel utilization rate was defined using the following equation:

$$U_f = \frac{I}{2F \times n_{H_2, inlet}} \times 100\% \quad (1)$$

where

I denotes the electric current generated by the cell;

F represents Faraday constant (A s mol$^{-1}$); and $n_{H_2, inlet}$ is the molar flow rate of hydrogen (mol s$^{-1}$).

Figure 14:
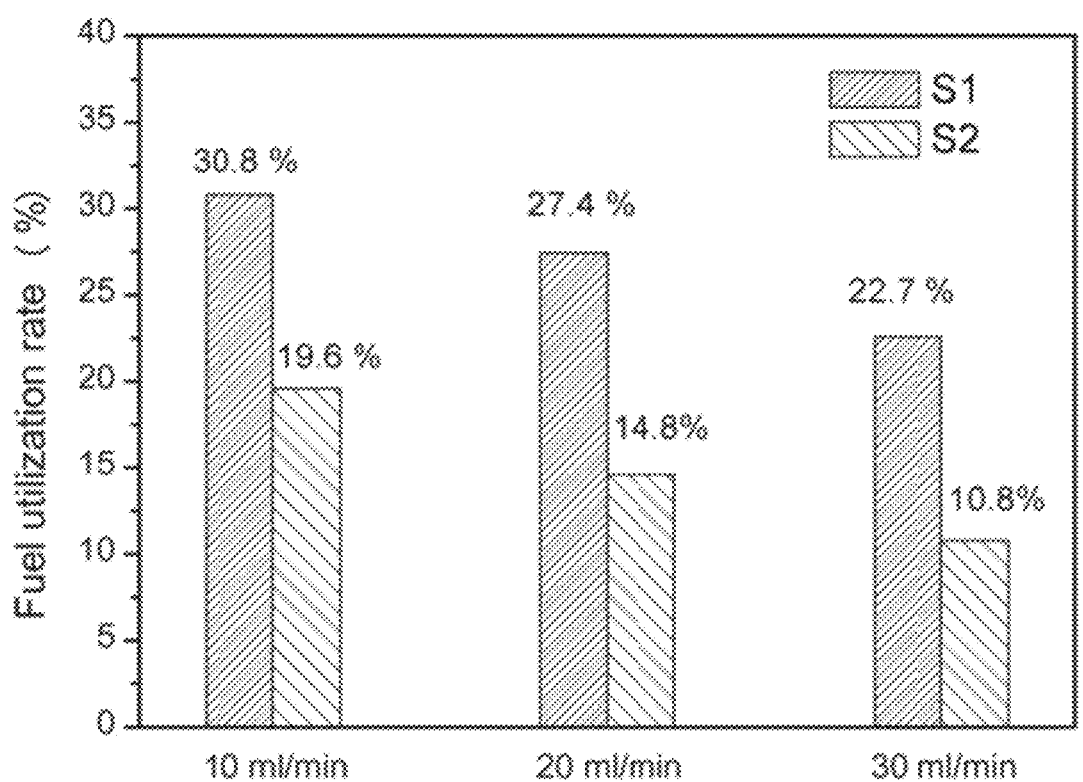
FIG. 14 graphically compares the fuel utilization rates of cells with different anode structures at different fuel feeding rates.
Figure 15A:
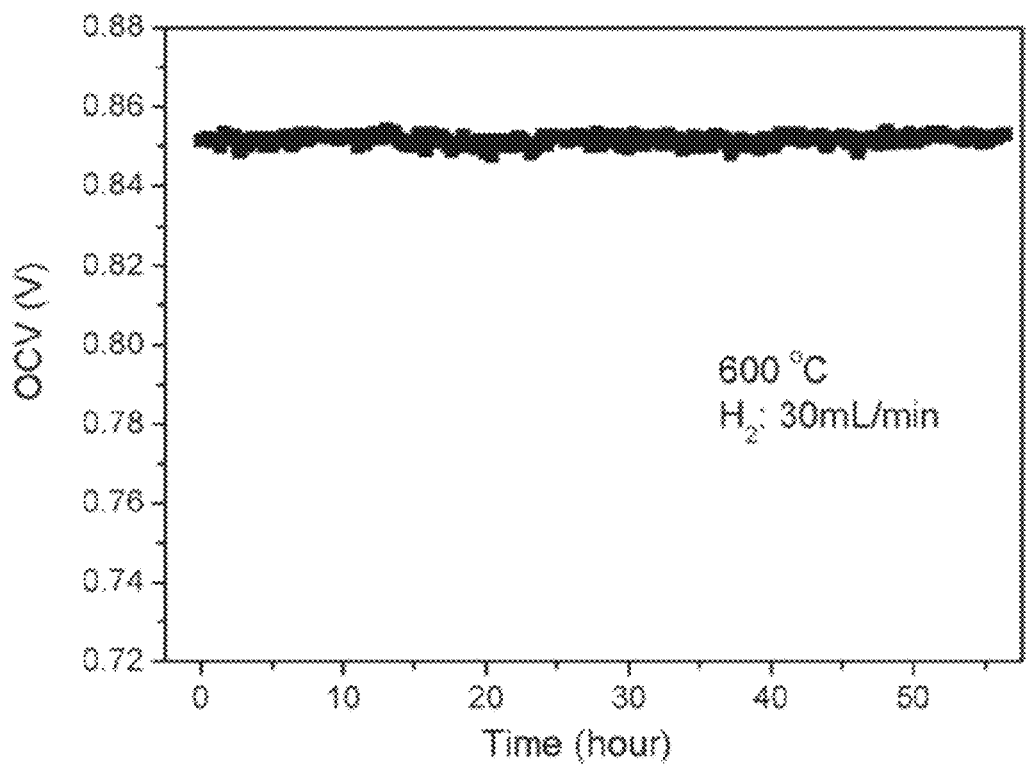
FIG. 15A presents the OCVs as a function of the elapsed time of cells formed as disclosed herein and utilized at a fuel feeding rate of 30 mL min$^{-1}$ at 600° C.
Figure 15B:
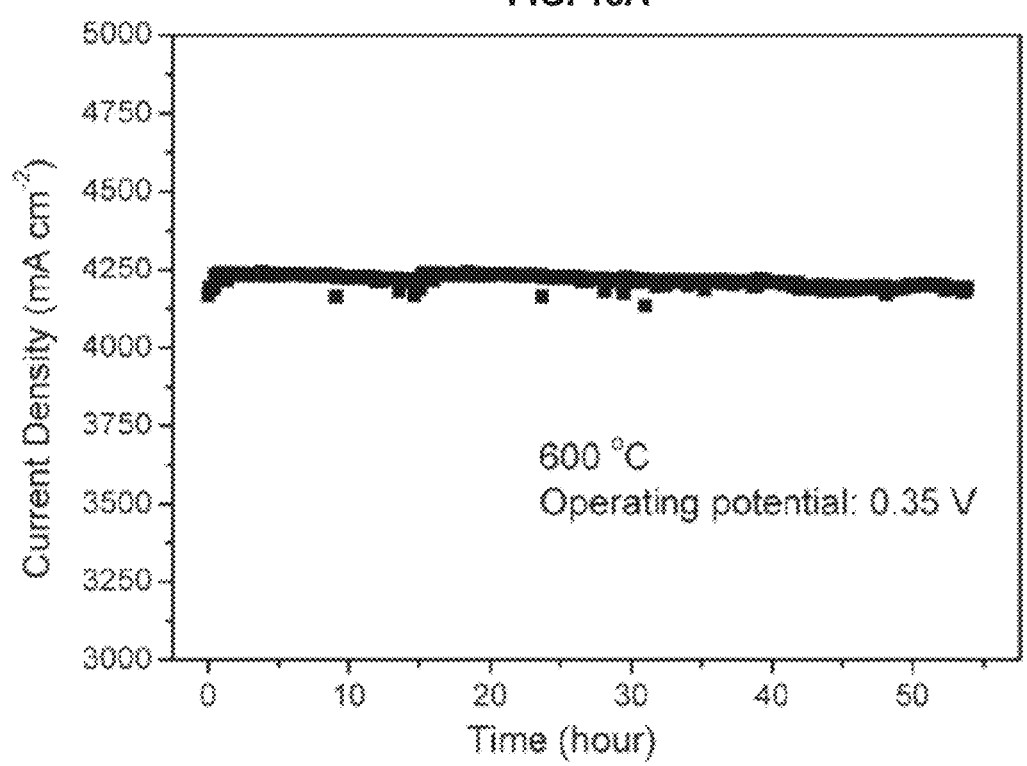
FIG. 15B presents the current density as a function of the operating time with output potential of 0.35 V (corresponding to maximum power density) of cells formed as disclosed herein and utilized at a fuel feeding rate of 30 mL min$^{-1}$ at 600° C.
Figure 16:
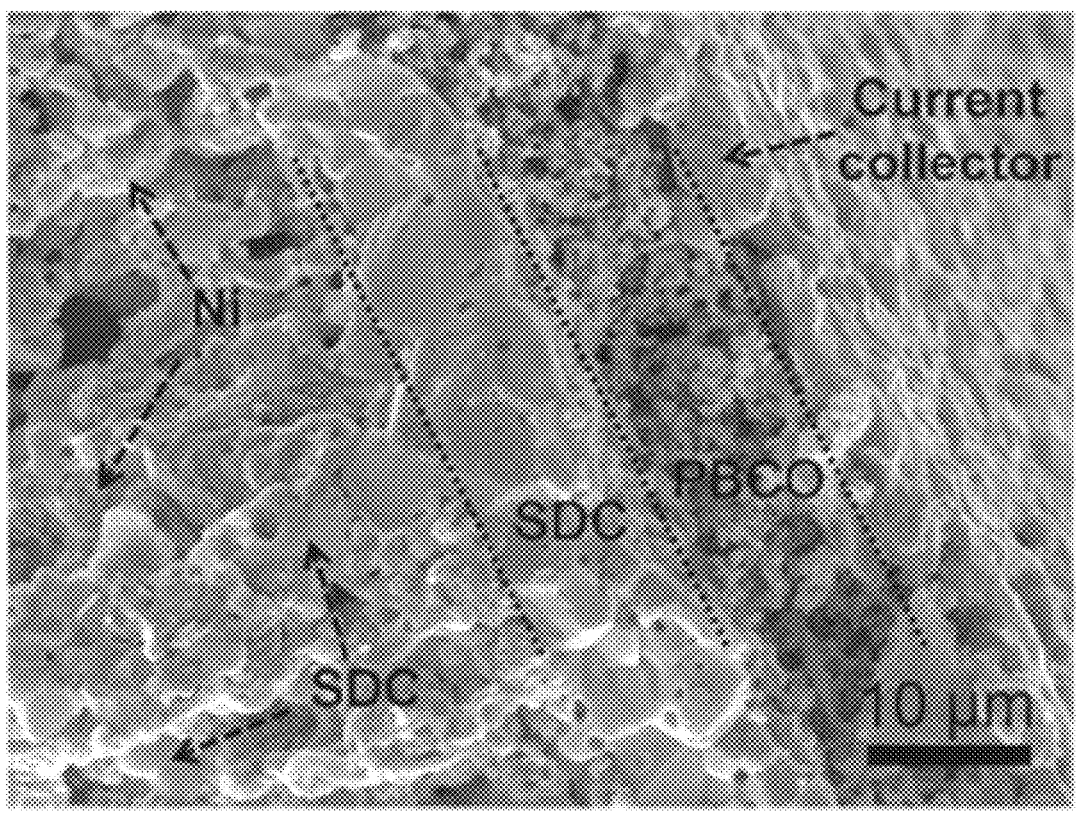
FIG. 16 presents a cross sectional SEM image of the cell of FIG. 15A and FIG. 15B post-test.

To simplify the analysis, the electrical current I at the maximum power density was chosen for the calculation of fuel utilization rate. As shown in FIG. 14, the fuel utilization rate of conventional cell was 19.6%, 14.8% and 10.8% at the inlet fuel flow rate of 10, 20, and 30 mL min$^{-1}$, respectively. However, that of the disclosed cell reached 30.8%, 27.4% and 22.7% respectively. Obviously the disclosed cell significantly improved the fuel utilization rate, especially at the high inlet fuel flow rate of 30 mL min$^{-1}$, where the fuel utilization rate was almost doubled compared to the conventional cell. Durability is of particular importance for practical applications of SOFC technology. Here the short-term stability of the fabricated disclosed cell was demonstrated. The operating temperature of 600° C. and the in-let fuel flow rate of 30 mL min$^{-1}$ were used for the test. The short-term test was run for about 50 hours. The open circuit voltage of the cell was monitored as a function of the elapsed time. The results were recorded and shown in FIG. 15A. As one can see, the open circuit voltage was very stable, which can be attributed to the dense, crack-free, and stable structure of SDC electrolyte film. The short-term stability of the cell was also evaluated under external voltage loadings. Here, the loading voltage of 0.35 V was applied or equivalently the current density of about 4300 mA cm$^{-2}$ was generated, which corresponded to the maximum power density output of the cell. The short-term stability test under these conditions was shown in FIG. 15B. It can be seen that the current density was stable as well. The SEM characterization of the post-test cell indicated that the microstructure of the cell was stable. As shown in FIG. 16, a thin layer of silver current collector was observed on the cathode surface.

The SDC electrolyte was dense with a few closed pores but without any cracks, and was intimately adhered to both the Ni-SDC anode substrate and PBCO cathode layer. The NiO phase was reduced to metallic nickel under the $H_2$ atmosphere and became porous. The micro-channels in Ni-SDC layer were still observable even though the cross section was enlarged locally. The cross-sectional image of post-test cell did not show obvious visible differences from that of the pre-test cell. These results indicated a very good structural stability of our MT-SOFC.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole and in part. Furthermore, those of ordinary skill in the art will appreciate that the foregoing description is by way of example only, and is not intended to limit the invention so further described in the appended claims.

What is claimed:

1. A method for forming a tubular solid oxide cell comprising:
    co-extruding a first composition and a second composition to form a co-axial multi-layer precursor tube, the first composition including a solid oxide electrode material, a first polymeric binder, and a first solvent, the second composition comprising a solid particulate, a second polymeric binder, and a second solvent, the co-axial multi-layer precursor tube comprising a first electrode precursor layer and a sacrificial layer, the first electrode precursor layer comprising the first composition and the sacrificial layer comprising the second composition;
    contacting the co-axial multi-layer precursor tube with an anti-solvent, wherein following the contact a plurality of porous sub-layers are formed in the multi-layer precursor tube; and
    sintering the co-axial multi-layer tube to remove the sacrificial layer and form a sintered first electrode layer.

2. The method of claim 1, further comprising forming a precursor electrolyte layer on the first electrode precursor layer and sintering the precursor electrolyte layer.

3. The method of claim 2, wherein the precursor electrolyte layer is sintered in conjunction with the sintering of the co-axial multi-layer tube.

4. The method of claim 3, further comprising forming a precursor second electrode layer on the sintered electrolyte layer.

5. The method of claim 1, wherein the solid oxide electrode material is an anode material.

6. The method of claim 1, wherein the sintered first electrode layer has a wall thickness of 500 micrometers or less.

7. The method of claim 1, further comprising passing an anti-solvent through the center of the co-axial multi-layer precursor tube as the first and second compositions are co-extruded.

8. The method of claim 1, wherein the first polymeric binder and the second polymeric binder are the same.

9. The method of claim 1, wherein the first solvent and the second solvent are the same.

10. The method of claim 1, the first composition and/or the second composition comprising a polymeric dispersant.

11. The method of claim 1, wherein the anti-solvent is water.

12. The method of claim 1, wherein the sub-layers include an inner skin sub-layer, an inner finger-like sub-layer, a sponge-like sub-layer, an outer finger-like sub-layer and an outer skin sub-layer that are arranged in this order in the radial direction across the sacrificial layer and the first electrode precursor layer, the sacrificial layer being interior to the first electrode layer.

13. A method for forming a tubular solid oxide cell comprising:
    co-extruding a first composition and a second composition to form a co-axial multi-layer precursor tube, the first composition including a solid oxide electrode material, a first polymeric binder, and a first solvent, the second composition comprising a solid particulate, a second polymeric binder, and a second solvent, the co-axial multi-layer precursor tube comprising a first electrode precursor layer and a sacrificial layer, the first electrode precursor layer comprising the first composition and the sacrificial layer comprising the second composition;
    contacting the co-axial multi-layer precursor tube with an anti-solvent, wherein following the contact a plurality of porous sub-layers are formed in the multi-layer precursor tube, the sub-layers comprising an inner skin sub-layer, an inner finger-like sub-layer, a sponge-like sub-layer, an outer finger-like sub-layer and an outer skin sub-layer arranged in this order in the radial direction across the sacrificial layer and the first electrode precursor layer, wherein a first portion of the outer skin sub-layer is in the sacrificial layer and a second portion of the outer skin sub-layer is in the first electrode layer, the sacrificial layer being interior to the first electrode layer; and
    sintering the co-axial multi-layer tube to remove the sacrificial layer and form a sintered first electrode layer.

14. The method of claim 13, further comprising forming a precursor electrolyte layer on the first electrode precursor layer and sintering the precursor electrolyte layer.

15. The method of claim 14, further comprising forming a precursor second electrode layer on the sintered electrolyte layer.

16. The method of claim 13 further comprising passing an anti-solvent through the center of the co-axial multi-layer precursor tube as the first and second compositions are co-extruded.

17. The method of claim 13, wherein the first polymeric binder and the second polymeric binder are the same.

18. The method of claim 13, wherein the first solvent and the second solvent are the same.

19. The method of claim 13, wherein the anti-solvent is water.

* * * * *